United States Patent [19]

Piovoso et al.

[11] Patent Number: 5,294,998
[45] Date of Patent: Mar. 15, 1994

[54] METHOD FOR DESIGNING AND APPLYING A KAISER WINDOW FILTER FOR ENLARGING OR REDUCING AN IMAGE

[75] Inventors: Michael J. Piovoso, Newark; Mark D. Wetzel, Bear; James A. Whitcomb, Wilmington, all of Del.

[73] Assignee: E. I. Du Pont de Nemours and Company, Wilmington, Del.

[21] Appl. No.: 1,932

[22] Filed: Jan. 8, 1993

Related U.S. Application Data

[63] Continuation of Ser. No. 636,647, Dec. 31, 1990, abandoned.

[51] Int. Cl.$^5$ .............................................. H04N 1/41
[52] U.S. Cl. ................................ 358/428; 358/451; 358/444; 382/47; 382/54
[58] Field of Search ............... 358/451, 428, 448, 444, 358/77; 382/54, 47, 42; 364/518

[56] References Cited

U.S. PATENT DOCUMENTS

| | | | |
|---|---|---|---|
| 4,124,871 | 11/1978 | Morrin, II | 358/287 |
| 4,303,947 | 12/1981 | Stoffel | 358/428 |
| 4,623,922 | 11/1986 | Wischermann | 358/428 |
| 4,653,013 | 3/1987 | Collins et al. | 364/518 |
| 4,686,580 | 8/1987 | Kato et al. | 358/287 |
| 4,712,141 | 12/1987 | Tomohisa et al. | 358/280 |
| 4,760,605 | 7/1988 | David et al. | 382/47 |
| 4,774,581 | 9/1988 | Shiratsuchi | 358/180 |
| 4,774,678 | 9/1988 | David et al. | 364/518 |
| 4,809,083 | 2/1989 | Nagano et al. | 358/287 |
| 4,829,370 | 5/1989 | Mayne et al. | 358/78 |
| 4,833,531 | 5/1989 | Abe et al. | 358/77 |
| 4,885,786 | 12/1989 | Anderson et al. | 382/47 |
| 4,893,258 | 1/1990 | Sakuragi | 364/521 |
| 4,920,571 | 4/1990 | Abe et al. | 382/47 |
| 5,072,308 | 10/1991 | Lin et al. | 358/428 |
| 5,157,517 | 10/1992 | Byrne et al. | 358/451 |

FOREIGN PATENT DOCUMENTS

| | | |
|---|---|---|
| 0225029 | 6/1987 | European Pat. Off. . |
| 256816 | 2/1988 | European Pat. Off. . |
| 286286 | 10/1988 | European Pat. Off. . |
| 0342845 | 11/1989 | European Pat. Off. . |
| 0360155 | 3/1990 | European Pat. Off. . |
| 2158322A | 11/1985 | United Kingdom . |
| WO9000780 | 1/1990 | World Int. Prop. O. . |

OTHER PUBLICATIONS

Dawson, Benjamin M., "Processing Extends Scientific Vision", *Laser Focus World*, (Feb. 1991), pp. 121-132.
Swartzlander, Earl E., Jr. et al., "How to Transform, Interpolate and Improve Your Image", *Quest*, vol. 10, No. 2, (Winter 1987/1988).

*Primary Examiner*—Edward L. Coles, Sr.
*Assistant Examiner*—Fan Lee

[57] ABSTRACT

The present invention relates to a method of designing a Kaiser window filter. The filter is applied to an input image to generate a resized output image while preserving the information content of the input image. The method of mapping the output image space to the input image space of the present invention aligns the boundaries of the input image space with the boundaries of a set of new input pixels, and the coordinate points of the output pixels map to corresponding coordinate points of the new input pixels.

43 Claims, 26 Drawing Sheets

Microfiche Appendix Included
(1 Microfiche, 50 Pages)

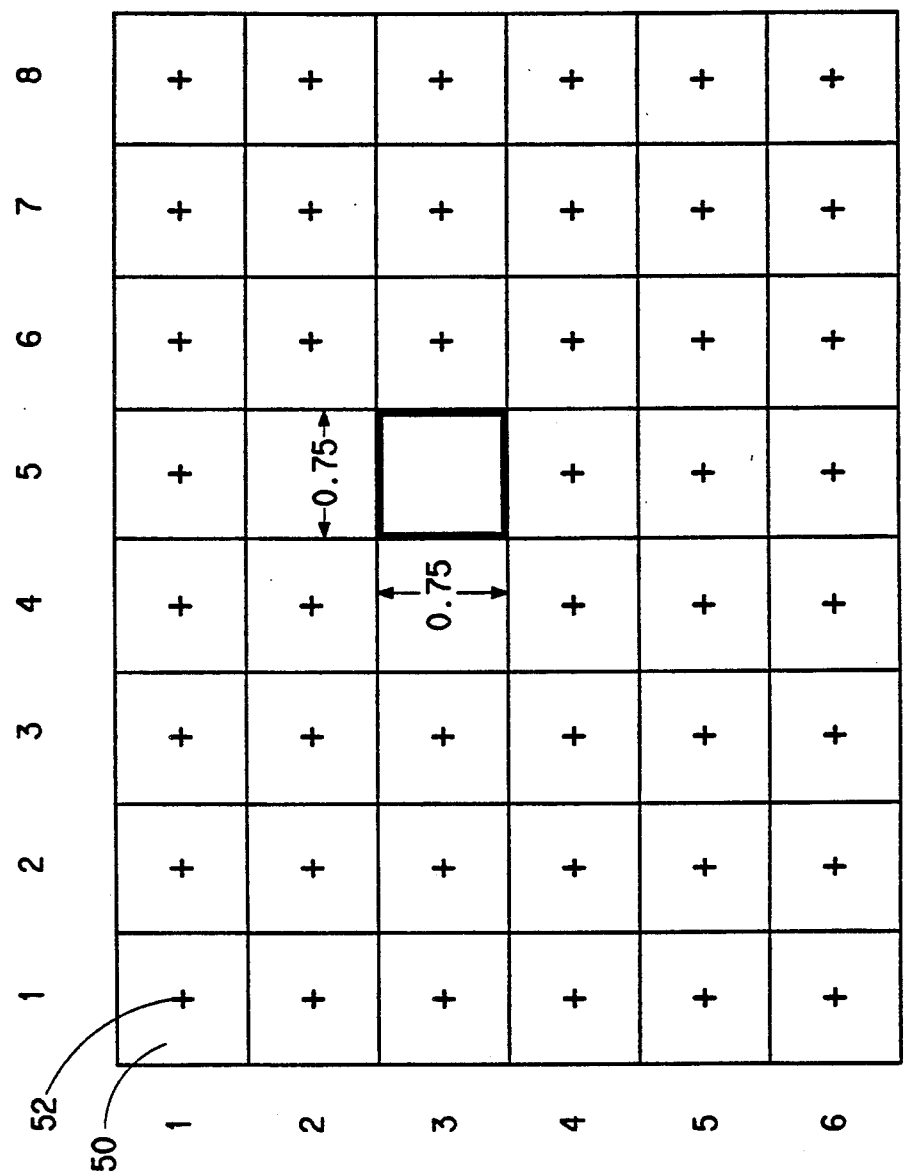

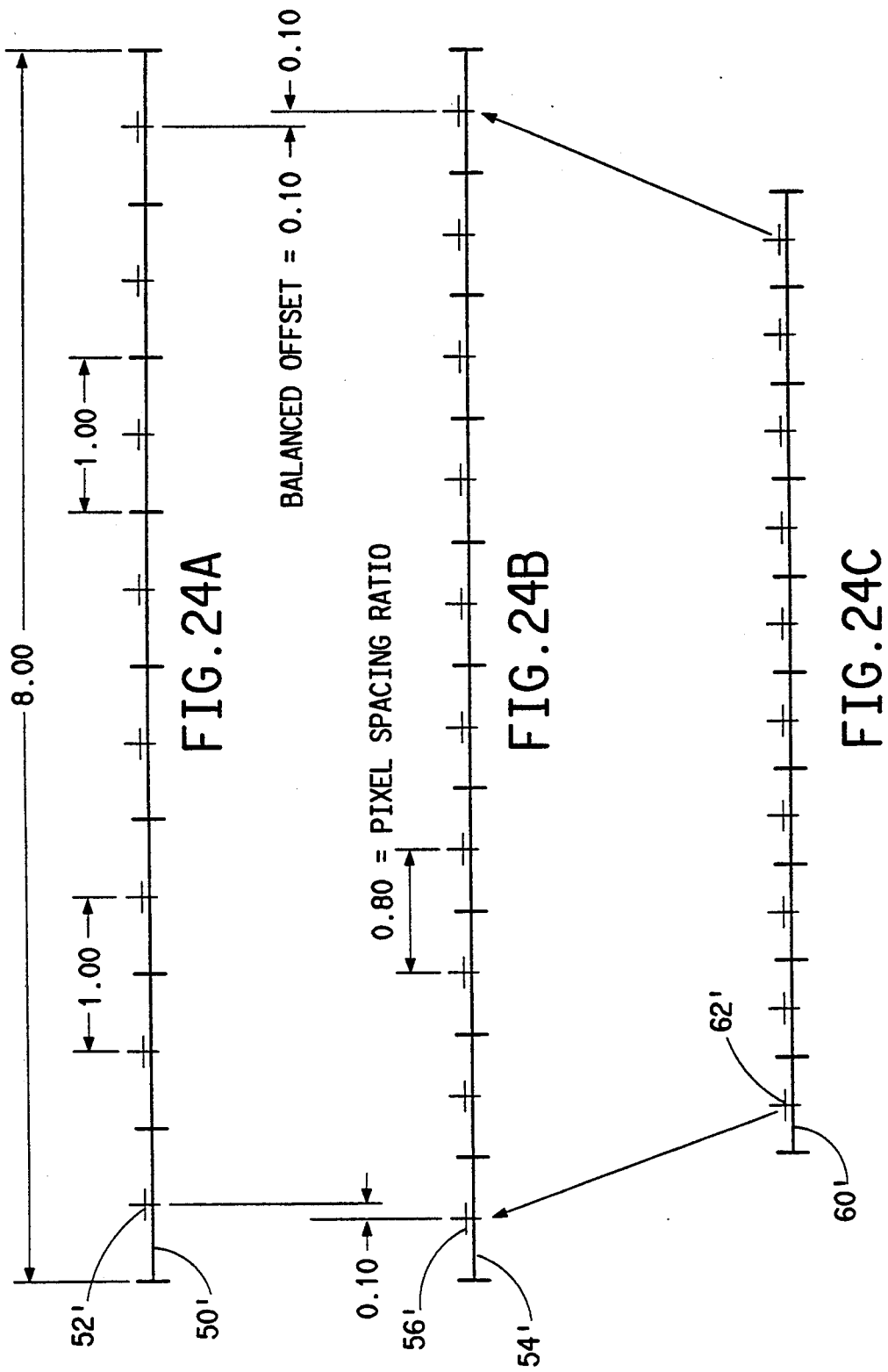

METHOD FOR DESIGNING AND APPLYING A KAISER WINDOW FILTER FOR ENLARGING OR REDUCING AN IMAGE

This is a continuation, of application Ser. No. 07/636,647 filed Dec. 31, 1990, now abandoned.

Attached hereto are microfiche containing 50 frames of modules which can be employed in the described embodiment and other embodiments. These microfiche are included as a portion of the disclosure of this patent document.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates generally to the field of digital signal processing and more specifically to a method of resizing (i.e., interpolating or decimating) an image while preserving the information content of the image, a method of designing a filter for resizing the image and a method of mapping the output image space to the input image space of the resized image.

Description of the Related Art

Digital image-processing systems are important in a wide variety of applications, such as medical imaging, color printing, visual inspection systems and data storage systems. These applications often require expanding an image (interpolation) or contracting an image (decimation) to better examine the image. Decimation in particular is used in data storage and printing applications.

Interpolation or decimation of an image requires resampling of original sampled data to a new pixel mapping scheme. Conceptually, data resampling requires two steps: first, a coordinate system transformation, and then pixel interpolation or decimation. Coordinate system transformation is an address calculation that determines where the desired output pixel is located with respect to the original, input pixels. Pixel interpolation or decimation constructs output pixels of the output image by performing a discrete convolution of the original image by an interpolation or decimation kernel. Pixel interpolation or decimation is required when the transformed pixel positions do not coincide with the original pixel positions. New pixel values are obtained by interpolating or decimating between original pixels in the neighborhood of the desired pixel position.

A common interpolation or decimation technique is the cubic spline technique. With the cubic spline technique, a sequence of numbers is fitted with cubic sequence polynomials, which have continuity in values and first derivatives at common points. Interpolation or decimation is accomplished by resampling the cubic equation. The cubic equation guarantees to duplicate existing data from a spatial point of view. However, from a frequency domain point of view, the cubic spline technique theoretically is not the best type of interpolator or decimator, since it produces artifacts in the resized image due to overshoot and undershoot in the intensity transitions regions.

Other known interpolation or decimation techniques include pixel-replication, also known as the sharp mode technique, and linear or bilinear interpolation or decimation. Pixel-replication repeats an input value for each of a desired number of output pixels. In the interpolation-dominant case (i.e., where the interpolation rate is greater than or equal to the decimation rate), pixel-replication introduces visual artifacts to the resized image. In the decimation-dominant case (i.e., where the decimation rate is greater than the interpolation rate), pixel-replication causes significant loss of information. Linear interpolation or decimation fits a straight line between two adjacent input pixels and resamples the line at the location of the output pixels. Two-dimensional or bilinear interpolation or decimation takes four input pixels, constructs a plane therefrom and resamples the plane at the location of the output pixels. Linear and bilinear interpolation or decimation have poor responses in regions of large transitions in the image.

When an image is resized, the edges of the output image space may not be aligned with the edges of the input image space. If the edges output image space are shifted to align with the edges of the input image space, then the ratio of the spacing between pixels is not the same as the ratio of the number of pixels in the input image space to the number of pixels in the output image space. Thus, the pixel spacing is not as expected.

An alternative is to fix the pixel spacing ratio to the expected value. In this case, by maintaining the alignment of the first pixel, as is normally done for image resizing, the last pixels are not aligned. Thus, the edges of the input image space and the output image space are not treated similarly, and all the information along the edges of the input image space does not appear in the output image space.

Accordingly, it is an object of the present invention to provide a method of designing a filter using frequency domain techniques for resizing an image while preserving the information content of the image, thereby reducing the introduction of artifacts or distortion in the resized image.

A further object of the present invention is to provide a method of designing a filter using frequency domain techniques for resizing an image while preserving the information content of the image which replicates those pixels of the input image which are retained in the output image.

Still another object of the present invention is to provide a method of resizing an image by applying a filter for resizing an image while preserving the information content of the image.

Another object of the present invention is to provide a method of mapping the pixels of an output image space to an input image space when resizing the image which creates a set of new input pixels, whereby the boundaries of the original input pixels of the input image space and the new input pixels are aligned and each of the output pixel coordinate points maps to a corresponding new input pixel coordinate point. This method views each pixel as having an area of coverage. With this method, the spacing ratio and the pixel count ratio are identical, and the edges of the input image space and the output image space are treated identically, so that no information is lost.

It is intended that the present invention be equally applicable to the fields of X-ray imaging, printing and publishing, visual inspection systems and data storage systems.

SUMMARY OF THE INVENTION

The present invention is directed to a method of designing a filter and a method of applying the filter for resizing an image. The method of designing the filter comprises selecting a first interpolation rate and a first decimation rate for a first sense and a second interpolation rate and a second decimation rate for a second sense. A first stopband attenuation and a first sharpness factor are selected for the first sense and a second stopband attenuation and a second sharpness factor are selected for the second sense. A first cutoff frequency is computed for the first sense, and a second cutoff frequency is computed for the second sense. An input kernel is established, where the input kernel has a first number of elements in the first sense and a second number of elements in the second sense. A first low-pass filter is generated for the first sense. The first low-pass filter comprises a first filter vector comprising a plurality of first coefficients. The first low-pass filter is modified by creating a first vector comprising a plurality of elements, each having a value equal to unity, where the first vector has a dimensionality equal to the first interpolation rate, and convolving the first filter vector with the first vector to create a modified first filter vector comprising a plurality of the first coefficients. A second low-pass filter is generated for the second sense. The second low-pass filter comprises a second filter vector comprising a plurality of second coefficients. The second low-pass filter is modified by creating a second vector comprising a plurality of elements each having a value equal to unity, where the second vector has a dimensionality equal to the second interpolation rate, and convolving the second filter vector with the second vector to create a modified second filter vector comprising a plurality of the second coefficients. A first set of coefficient vectors is created by selecting a plurality of the coefficients of the modified first filter vector as a function of the first interpolation rate, the first decimation rate and the first number of elements. A second set of coefficient vectors is created by selecting a plurality of the coefficients of the modified second filter vector as a function of the second interpolation rate, the second decimation rate and the second number of elements. The first and second sets of coefficient vectors are applied to a neighborhood of the values of the input pixels adjacent each output pixel to compute the value of each output pixel and the computed values are assigned to the corresponding output pixels, thereby producing a resized image. The resized image is stored in an output memory device.

The method of resizing an input image comprises sampling the input image at a predetermined first interval in a first sense and at a predetermined second interval in a second sense for producing input data values for the location of each input pixel. A predetermined third interval is established in the first sense and a predetermined fourth interval is established in the second sense for producing output data values for the location of each output pixel. A filter is designed as set forth above. The first and second sets of coefficient vectors as set forth above are applied to a neighborhood of the values of the input pixels adjacent each output pixel to compute the value of each output pixel, and the computed values are assigned to the corresponding output pixels, thereby producing a resized image. The resized image is stored in an output memory device.

The present invention is also directed to a method of mapping the pixels of an output image space to an input image space when resizing an image. The method comprises defining the input image space as including a predetermined number of non-overlapping, original input pixels, each original input pixel comprising a two-dimensional area represented by an input pixel coordinate point and extending in a first input sense and a second input sense. A total input image area is defined as the sum of the areas of each original input pixel, the total input image area having a first input extent in the first sense and a second input extent in the second sense. The output image space is defined as including a predetermined number of output pixels, each output pixel comprising a two-dimensional area extending in a first output sense and a second output sense, where the output image space has a first number of output pixels in the first output sense and a second number of output pixels in the second output sense. A set of new input pixels is defined by dividing the first input extent by the first number of output pixels and by dividing the second input extent by the second number of output pixels, each of the new input pixels being represented by an input pixel coordinate point and corresponding to an output pixel, whereby the boundaries of the original input pixels and the new input pixels are aligned, and each of the output pixel coordinate points maps to a corresponding new pixel coordinate point. A filter for resizing the input image is applied in the first and second output senses to a neighborhood of the values of the input pixels adjacent each new input pixel to compute the value of each of the new input pixels, and the computed values are assigned to the corresponding output pixels, whereby the image is resized. The values of the output pixels are stored in an output memory device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 23A is a plan view of an input image space comprising a plurality of original input pixels for which a two-dimensional mapping is performed as described in Example 5.

FIG. 23B is a plan view of a set of new input pixels for which a two-dimensional mapping is performed as described in Example 5.

FIG. 23C is a plan view of an output image space comprising a plurality of output pixels for which a two-dimensional mapping is performed as described in Example 5.

FIG. 24A is a plan view of an input image space for which a one-dimensional mapping is performed as described in Example 6.

FIG. 24B is a plan view of a set of new input pixels for which a one-dimensional mapping is performed as described in Example 6.

FIG. 24C is a plan view of an output image space comprising a plurality of output pixels for which a one-dimensional mapping is performed as described in Example 6.

DETAILED DESCRIPTION OF THE PREFERRED EMBODIMENTS

Reference will now be made in detail to the present preferred embodiments of the invention as illustrated in the accompanying drawings.

In accordance with the invention, the present invention comprises a method of designing a filter for resizing an input image comprising a plurality of input pixels to generate a resized image comprising a plurality of corresponding output pixels while preserving the information content of the input image. The method of the present invention is applicable to designing both an interpolation-dominant and a decimation-dominant filter. In an interpolation-dominant filter, the interpolation rate is greater than or equal to the decimation rate, and application of the filter resizes the input image to an output image which is larger than the input image, at least in one sense. In a decimation-dominant filter, the decimation rate is greater than the interpolation rate, and application of the filter resizes the input image to an output image which is smaller than the input image, at least in one sense.

Figure 1:
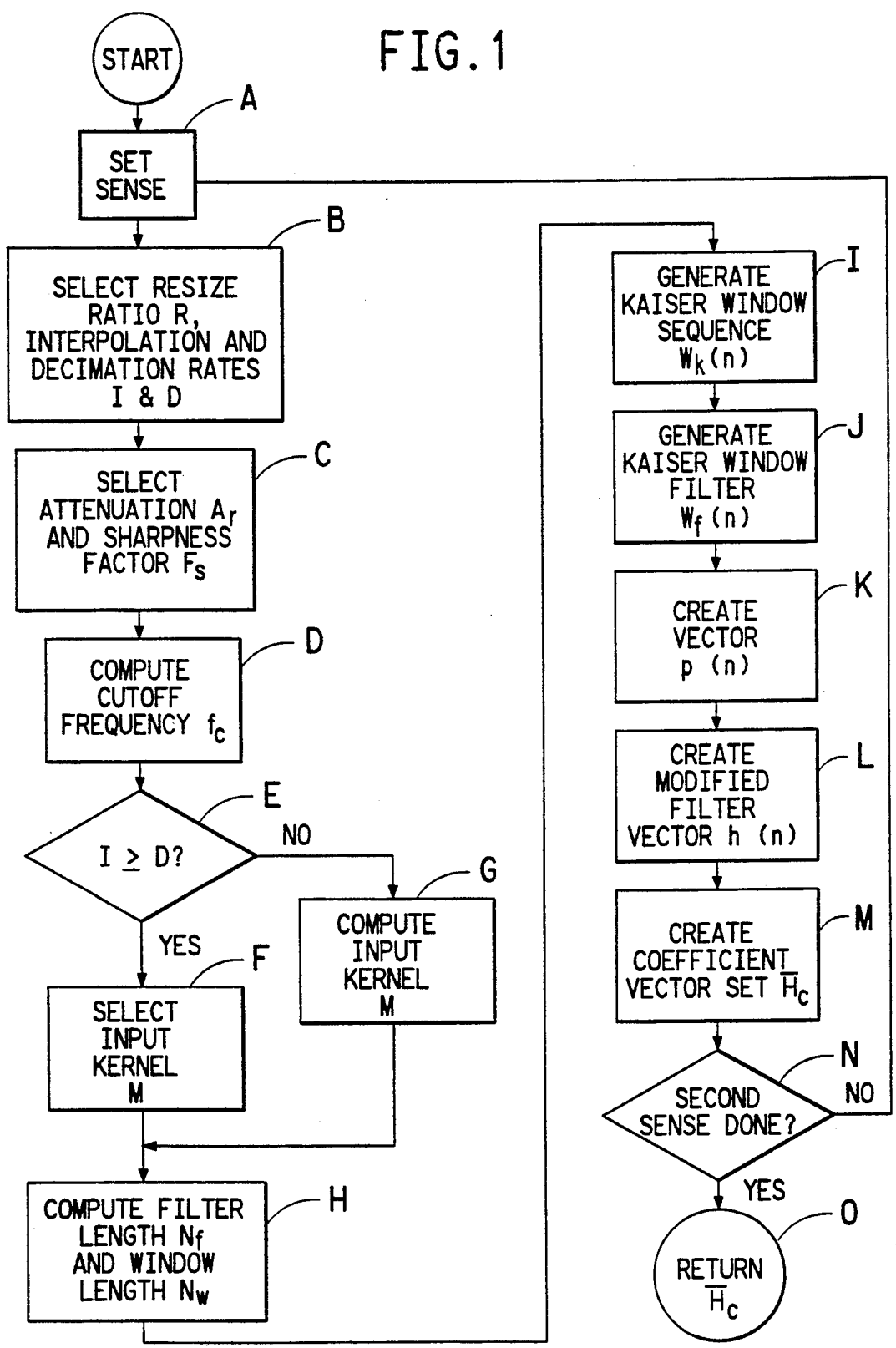
FIG. 1 is a flowchart of the method for computing a first and a second coefficient vector set.
Figure 2:
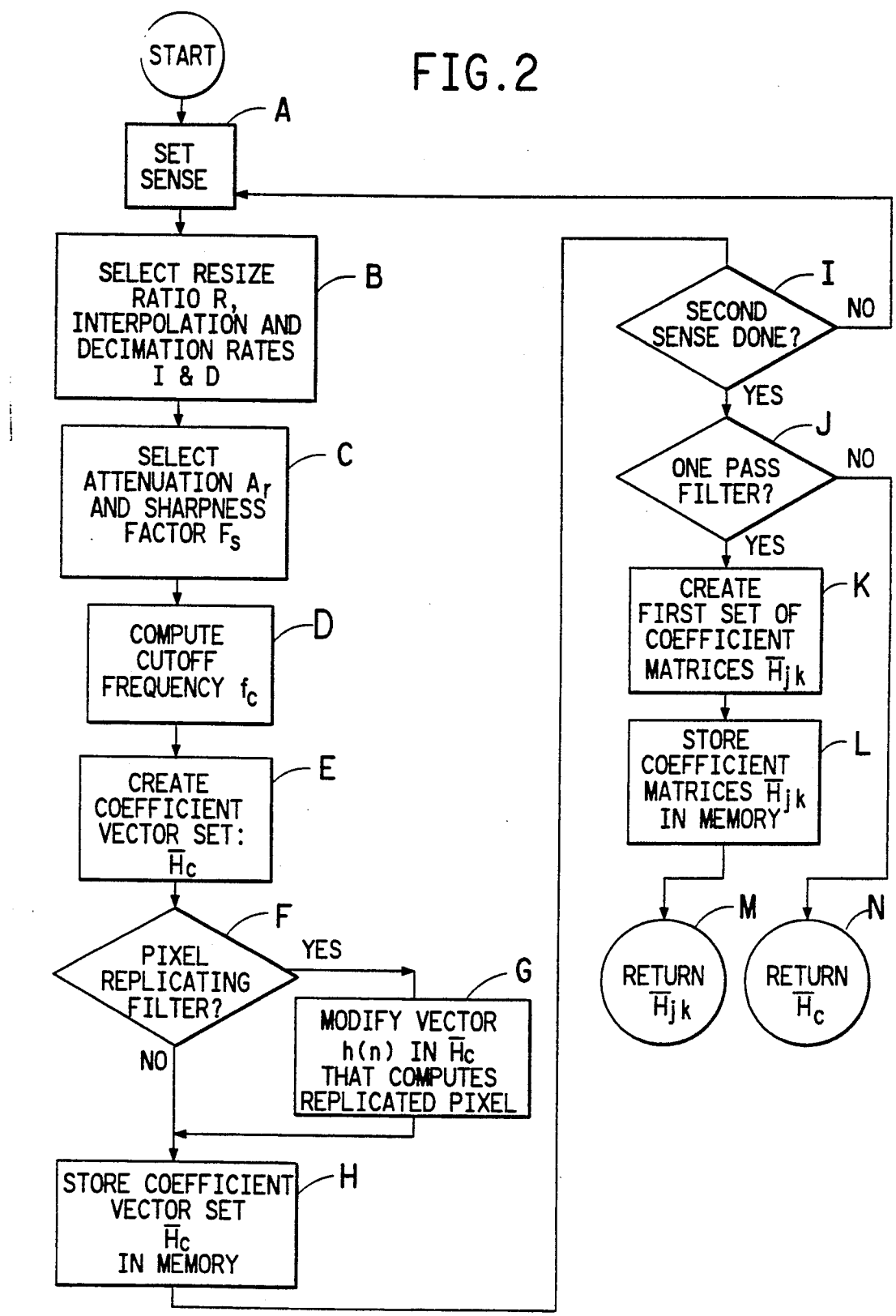
FIG. 2 is a flowchart of the method for designing a filter for two senses.

The flowcharts for the method of designing a filter of the present invention are shown in FIGS. 1 and 2. The method comprises the step of selecting a first interpolation rate and a first decimation rate in a first sense. In accordance with the method of the present invention, a first sense $x_1$ is set. This step is shown in block A of FIGS. 1 and 2. A first resize ratio $R_1$ for the first sense is selected as shown in block B of FIGS. 1 and 2, and a first interpolation rate $I_1$ and a first decimation rate $D_1$ are selected for a first sense $x_1$ as shown in block B in FIGS. 1 and 2. First interpolation rate $I_1$ and first decimation rate $D_1$ are selected as an integer ratio equal to or close to $R_1$, where $R_1 = I_1/D_1$.

The decision diamonds N in FIG. 1 and I in FIG. 2 ask whether all the computations of the method of the present invention have been performed in the second sense. If not, a second sense $x_2$ is set as shown in blok A of FIGS. 1 and 2.

The method also comprises the step of selecting a second interpolation rate and a second decimation rate in a second sense A second resize ratio $R_2$ is selected, and a second interpolation rate $I_2$ and a second decimation rate $D_2$ are selected for second sense $x_2$ as shown in block B of FIGS. 1 and 2. Second interpolation rate $I_2$ and second decimation rate $D_2$ are selected as an integer ratio equal to or close to $R_2$, where $R_2 = I_2/D_2$.

It should be noted that the first and second interpolation rates and the first and second decimation rates are integers, since the pixel spacing must be constant in the first and second senses. Thus, the resampling rate, R, which is defined as the ratio I/D may be either an integer or a non-integer. Also, although the first and second senses are usually orthogonal to each other, the invention is not limited to this arrangement. For example, the first and second senses may be non-orthogonal for a warped image.

The method of designing a filter also includes the step of selecting a first stopband attenuation and a first sharpness factor for the first sense and a second stopband attenuation and a second sharpness factor for the second sense. A first stopband attenuation $A_{r1}$ and a first sharpness factor $F_{s1}$ are selected for first sense $x_1$, and a second stopband attenuation $A_{r2}$ and a second sharpness factor $F_{s2}$ are selected for second sense $x_2$. This step is designated by block C in FIGS. 1 and 2. It should be noted that the first and second stopband attenuations are chosen to be as low as possible, since it is desirable to have a maximum amount of attenuation in the stopband.

The method of designing a filter also comprises the step of computing a first cutoff frequency for the first sense and a second cutoff frequency for the second sense. A first cutoff frequency $f_{c1}$ is computed for first sense $x_1$ and a second outoff frequency $f_{c2}$ is computed for second sense $x_2$. This step is designated by block D in Figs. 1 and 2.

The first cutoff frequency $f_{c1}$ may be computed as follows. In the case where first interpolation rate $I_1$ is greater than or equal to first decimation rate $D_1$, first cutoff frequency $f_{c1}$, first sharpness factor $F_{s1}$ and first interpolation rate $I_1$ are related by the following equation:

$$f_{c1} = F_{s1}(\tfrac{1}{2}I_1)$$

In the case where first interpolation rate $I_1$ is less than first decimation rate $D_1$, first cutoff frequency $f_{c1}$, first sharpness factor $F_{s1}$ and first interpolation rate $I_1$ are related by the following equation:

$$f_{c1} = F_{s1}/2D_1$$

or, another way of saying this is that:

$$f_{c1} = F_{s1}/2 \; X \; (MAX \; I_1, D_1))$$

Second cutoff frequency $f_{c2}$ may be computed as follows. In the case where second interpolation rate $I_2$ is greater than or equal to second decimation rate $D_2$, second cutoff frequency $f_{c2}$, second sharpness factor $F_{s2}$ and second interpolation rate $I_2$ are related by the following equation:

$$f_{c2} = F_{s2}(\tfrac{1}{2}I_2)$$

In the case where second interpolation rate $I_2$ is less than second decimation rate $D_2$, second cutoff frequency $f_{c2}$, second sharpness factor $F_{s2}$ and second interpolation rate $I_2$ are related by the following equation:

$$f_{c2} = F_{s2}/2D_2$$

or, another way of saying this is that:

$$f_{c2} = F_{s2}/2 \; X \; (MAX(I_2, D_2))$$

The method of designing a filter also comprises the step of establishing an input kernel having a first number of elements in the first sense and a second number of elements in the second sense. This step is shown in blocks F and G of FIG. 1. An input kernel is established which has $M_1$ elements in the first sense and $M_2$ elements in the second sense. Both $M_1$ and $M_2$ are even integers. In the preferred embodiment, the input kernel has four elements in the first sense and four elements in the second sense. However, the method of the present invention is not limited to this size input kernel.

The four cases of where the first interpolation rate is greater than or equal to the first decimation rate or where the first decimation rate is greater than the first interpolation rate, and where the second interpolation rate is greater than or equal to the second decimation rate or where the second decimation rate is greater than the second interpolation rate, determine whether first and second numbers $M_1$ and $M_2$ of the input kernel are selected as shown in block F of FIG. 1 or computed as shown in block G of FIG. 1. In the first case, the first interpolation rate is greater than or equal to the first decimation rate and the second interpolation rate is greater than or equal to the second decimation rate. Here, the input image is interpolated or expanded in both the first and second senses. In this case, the step of establishing an input kernel includes the step of selecting the first and second number of elements as a function of the first and second interpolation rate, respectively, the first and second decimation rate, respectively, the first and second cutoff frequency, respectively, the first and second sharpness factor, respectively, and the first and second stopband attenuation, respectively.

In the second case, the first interpolation rate is greater than or equal to the first decimation rate and the second decimation rate is greater than the second interpolation rate. Here, the input image is interpolated or expanded in the first sense and is decimated or contracted in the second sense. In this case, the step of establishing an input kernel includes the step of selecting the first number of elements as a function of the first interpolation rate, the first cutoff frequency, the first sharpness factor and the first stopband attenuation and computing the second number of elements as a function of the second decimation rate, the second cutoff frequency, the second sharpness factor and the second stopband attenuation.

In the third case, the first decimation rate is greater than the first interpolation rate and the second interpolation rate is greater than or equal to the second decimation rate. Here, the input image is decimated or contracted in the first sense and is interpolated or expanded in the second sense. In this case, the step of establishing an input kernel includes the step of computing the first number of elements as a function of the first decimation rate, the first cutoff frequency, the first sharpness factor and the first stopband attenuation and selecting the second number of elements as a function of the second interpolation rate, the second cutoff frequency, the second sharpness factor and the second stopband attenuation.

In the fourth case, the first decimation rate is greater than the first interpolation rate and the second decimation rate is greater than the second interpolation rate. Here, the input image is decimated or contracted in both the first and second senses. In this case, the step of establishing an input kernel includes the step of computing the first number of elements as a function of the first interpolation rate, the first cutoff frequency, the first sharpness factor and the first stopband attenuation, and computing the second number of elements as a function of the second decimation rate, the second cutoff frequency, the second sharpness factor and the second stopband attenuation.

The method of designing a filter also comprises the step of generating a first low-pass filter, the first low-pass filter including a first filter vector comprising a first set of coefficients. A first low-pass filter is generated which includes a first filter vector $w_1(n)$. First filter vector $w_1(n)$ comprises a first set of coefficients, which are all real numbers.

The step of generating a first low-pass filter further includes the step of establishing a first windowbased filter having a first predetermined filter length and establishing a first window filter having a first predetermined window length. This step is illustrated by block H in FIG. 1. In the present invention, a window-based filter is the preferred type of low-pass filter. The first predetermined filter length is described by the equation:

$$N_{f1} = M_1 \times I_1 + 1$$

and the first predetermined window length is described by the equation:

$$N_{w1} = (M_1 - 1) \times I_1 + 2$$

First predetermined filter length $N_{f1}$ and first predetermined window length $N_{w1}$ of the first window-based filter are a function of first predetermined number $M_1$ of elements and first interpolation rate $I_1$. First predetermined filter length $N_{f1}$ is odd in order to be symmetrical with $M_1$, which represents the number of elements in the input kernel in first sense $x_1$.

The step of generating a first low-pass filter further includes the step of generating a first Kaiser window sequence. A first Kaiser window sequence $w_K(n)$ is generated which is a function of first predetermined window length $N_{w1}$ and a first stopband attenuation $A_{r1}$. This step is designated by block I in FIG. 1. Kaiser window sequences are known in the art of finite-duration impulse response (FIR) digital filters, as described in Elliott. *Handbook of Digital Signal Processing*, Academic Press, Inc., 1987, pp. 68–9. (Also see J. F. Kaiser, "Nonrecursive Digital Filter Design Using the Io-Sinh Window Function", Proceedings of IEEE Symposium on Circuits and Systems, Apr. 1974, pp. 20–23; and "Programs for Digital Signal Processing," (IEEE Press, John Wiley & Sons, edited by Digital Signal Processing Committee, IEEE Acoustic Speech & Signal Processing Society, 1979), pg. 5.2-1.) As described in Elliott, the Kaiser window sequence is designed based on discrete-time approximations of the prolate spheroidal wave functions. This window sequence has a flexible parameter $\beta$ that can be chosen to meet a given stopband attenuation, and the window length $N_{w1}$ can be chosen to meet the requirements of $\Delta f_1$. The Kaiser window sequence may be described as:

$$w_K(n) = \begin{cases} I_o\left[\beta\sqrt{1-\left(\frac{n}{(N-1)/2}\right)^2}\right] / I_o(\beta), & -\frac{N-1}{2} \leq n \leq \frac{N-1}{2} \\ 0 & \text{otherwise} \end{cases}$$

where $I_o$ is the modified zeroth-order Bessel function, which can be computed as:

$$I_o(x) = 1 + \sum_{k=1}^{\infty}\left[\frac{(x/2)^k}{k!}\right]^2$$

The parameter $\beta$ is typically in the range 2 to 10. As the value of $\beta$ increases, the stopband attenuation of the low-pass pass filter increases, and the transition band widens. The step of generating a first low-pass filter further includes the step of generating a first Kaiser window filter, the first Kaiser window filter being a function of the first cutoff frequency, the first sharpness factor and the first Kaiser window sequence. This step is designated by block J in FIG. 1. In the present invention, a Kaiser window filter is the preferred type of window-based filter, where the Kaiser window filter is designated by $w_f(n)$ and is a preferred type of filter $w_1(n)$.

The first low-pass filter is modified by creating a first vector comprising a plurality of elements, each having a value equal to unity, the first vector having a dimensionality equal to the first interpolation rate and convolving the first filter vector with the first vector to create a modified first filter vector comprising a plurality of the first coefficients. A first vector $p_1(n)$ comprising a plurality of elements is created, where:

$$p_1(n) = [1, 1, \ldots 1]$$

and the dimensionality of first vector $p_1(n)$ is equal to first interpolation rate $I_1$. First filter vector $w_1(n)$ is then convolved with first vector $p_1(n)$ to create a modified first filter vector $h_1(n)$ comprising a plurality of the first coefficients of first low-pass filter vector. This convolution is described by the equation:

$$h_1(n) = w_1(n) \circledast p_1(n)$$

where $\circledast$ represents a discrete convolution. This step is designated by block L in FIG. 1.

The method of designing a filter also comprises the step of generating a second low-pass filter, the second low-pass filter including a second filter vector comprising a second set of coefficients. A second low-pass filter is generated which includes a second filter vector $w_2(n)$.

Second filter vector $w_2(n)$ comprises a second set of coefficients, which are all real numbers.

The step of generating a second low-pass filter further includes the step of establishing a second window-based filter having a second predetermined filter length and establishing a second window filter having a second predetermined window length. This step is shown in block H in FIG. 1. As noted above, in the present invention, a window-based filter is the preferred type of low-pass filter. The second predetermined filter length is described by the equation:

$$N_{f2} = M_2 \times I_2 + 1$$

and the second predetermined window length is described by the equation:

$$N_{w2}(M_2-1) \times I_2 + 2$$

Second predetermined filter length $N_{f2}$ and second predetermined window length $N_{w2}$ of the second window-based filter are a function of second predetermined number $M_2$ of elements and second interpolation rate $I_2$. Second predetermined filter length $N_{f2}$ is odd in order to be symmetrical with $M_2$, which is an even number representing the number of elements in the input kernel in second sense $x_2$.

The step of generating a second low-pass filter further includes the step of generating a second Kaiser window sequence. A second Kaiser window sequence $w_K(n)$ is generated which is a function of second predetermined window length $N_{w2}$ and second stopband attenuation $A_{r2}$. This step is illustrated in block I of FIG. 1. The second Kaiser window sequence is generated in the same manner as the first Kaiser window sequence as discussed above.

The step of generating a second low-pass filter further includes the step of generating a second Kaiser window filter, the second Kaiser window filter being a function of the second cutoff frequency, the second sharpness factor and the second Kaiser window sequence. This step is illustrated in block J of FIG. 1. As noted above, in the present invention, a Kaiser window filter is the preferred type of window-based filter.

The second low-pass filter is modified by creating a second vector comprising a plurality of elements each having a value equal to unity, the second vector having a dimensionality equal to the first interpolation rate and convolving the second filter vector with the second vector to create a modified second filter vector comprising a plurality of the second coefficients. This step is shown in block K of FIG. 1. A second vector $p_2(n)$ comprising a plurality of elements each having a value equal to unity is created, where $p_2(n)$ is described by:

$$p_2(n) = [1, 1, \ldots 1]$$

The dimensionality of the second vector $p_2(n)$ is equal to second interpolation rate $I_2$. Second filter vector $w_2(n)$ is convolved with second vector $p_2(n)$ to create a modified second filter vector $h_2(n)$ comprising a plurality of the second coefficients of the second low-pass filter vector. Modified second filter vector $h_2(n)$ is described by the equation:

$$h_2(n) = w_2(n) * p_2(n)$$

where $*$ represents a discrete convolution.

The method of designing a filter also comprises the step of creating a first set of coefficient vectors by selecting a plurality of the coefficients of the modified first filter vector as a function of the first interpolation rate, the first decimation rate and the first number of elements. This step is shown by block M in FIG. 1 and block E in FIG. 2. A plurality of the coefficients of modified first filter vector $h_1(n)$ is selected as a function of first interpolation rate $I_1$, first decimation rate $D_1$ and first number of elements $M_1$ in the input kernel to create a first set of coefficient vectors $\overline{H}_{c1}$. Each row of $\overline{H}HD c_1$ represents a filter of length $M_1$ for each output pixel which has been resized in the first sense. The first set of coefficient vectors is expressed as:

$$\overline{H}_{c1} = \begin{bmatrix} \overline{h}_1 \\ \overline{h}_2 \\ \vdots \\ \overline{h}_I \end{bmatrix} = \begin{bmatrix} [h_1(I_1 + 1) & h_1(2I_1 + 1) & h_1(3I_1 + 1) & \ldots & h_1(M_1 I_1 + 1)] \\ [h_1(I_1) & h_1(2I_1) & h_1(3I_1) & \ldots & h_1(M_1 I_1)] \\ \vdots & & & & \vdots \\ [h_1(I_1 - (I_1 - 2)) & h_1(2I_1 - (I_1 - 2)) & h_1(3I_1 - (I_1 - 2)) & \ldots & h_1(M_1 I_1 - (I_1 - 2))] \end{bmatrix}$$

The method of designing a filter also comprises the step of creating a second set of coefficient vectors by selecting a plurality of the coefficients of the modified second filter vector as a function of the second interpolation rate, the second decimation rate and the second number of elements. A plurality of the coefficients of modified second filter vector $h_2(n)$ are selected as a function of second interpolation rate $I_2$, first decimation rate $D_2$ and second number of elements $M_2$ in the input kernel to create a second set of coefficient vectors $\overline{H}_{c2}$. Each row of $\overline{H}_{c2}$ represents a filter of length $M_2$ for each output pixel which has been resized in the second sense. The second set of coefficient vectors may be expressed as:

$$\overline{H}_{c2} = \begin{bmatrix} \overline{h}'_1 \\ \overline{h}'_2 \\ \vdots \\ \overline{h}'_I \end{bmatrix} = \begin{bmatrix} [h_2(I_2 + 1) & h_2(2I_2 + 1) & h_2(3I_2 + 1) & \ldots & h_2(M_2 I_2 + 1)] \\ [h_2(I_2) & h_2(2I_2) & h_2(3I_2) & \ldots & h_2(M_2 I_2)] \\ \vdots & & & & \vdots \\ [h_2(I_2 - (I_2 - 2)) & h_2(2I_2 - (I_2 - 2)) & h_2(3I_2 - (I_2 - 2)) & \ldots & h_2(M_2 I_2 - (I_2 - 2))] \end{bmatrix}$$

The method of designing a filter for resizing an input image also includes applying the first and second sets of coefficient vectors to a neighborhood of the values of the input pixels adjacent each output pixel to compute the value of each output pixel and assigning the computed values to the corresponding output pixels, thereby producing the resized image. The first and second sets of coefficient vectors $\overline{H}_{c1}$ and $\overline{H}_{c2}$, respectively, may be applied as either a one-pass or a two pass filter. In a two-pass case, the first set of coefficient vectors is applied to the neighborhood of values of the input image in the first sense to obtain a resultant set of pixels and the second set of coefficient vectors is applied in the second sense to the resultant set of pixels. Alternatively, in a one-pass case, the first and second sets of coefficient vectors are combined into a first set of coefficient matrices, and the first set of coefficient matrices is applied to the neighborhood of the values of the input pixels simultaneously in the first and second senses. The first and second sets of coefficient vectors are combined into a first set of coefficient matrices, $\overline{H}_{jk}$, as shown below:

$$\overline{H}_{jk} = \overline{h}_j^T \overline{h}_k \text{ for } \begin{matrix}(j = 1,2,\ldots,I)\\(k = 1,2,\ldots,I)\end{matrix}$$

The decision diamond for combining the first and second sets of coefficient vectors for a one-pass filter is designated J in FIG. 2. The step of computing the first set of coefficient matrices is shown in block K in FIG. 2.

Figure 3:
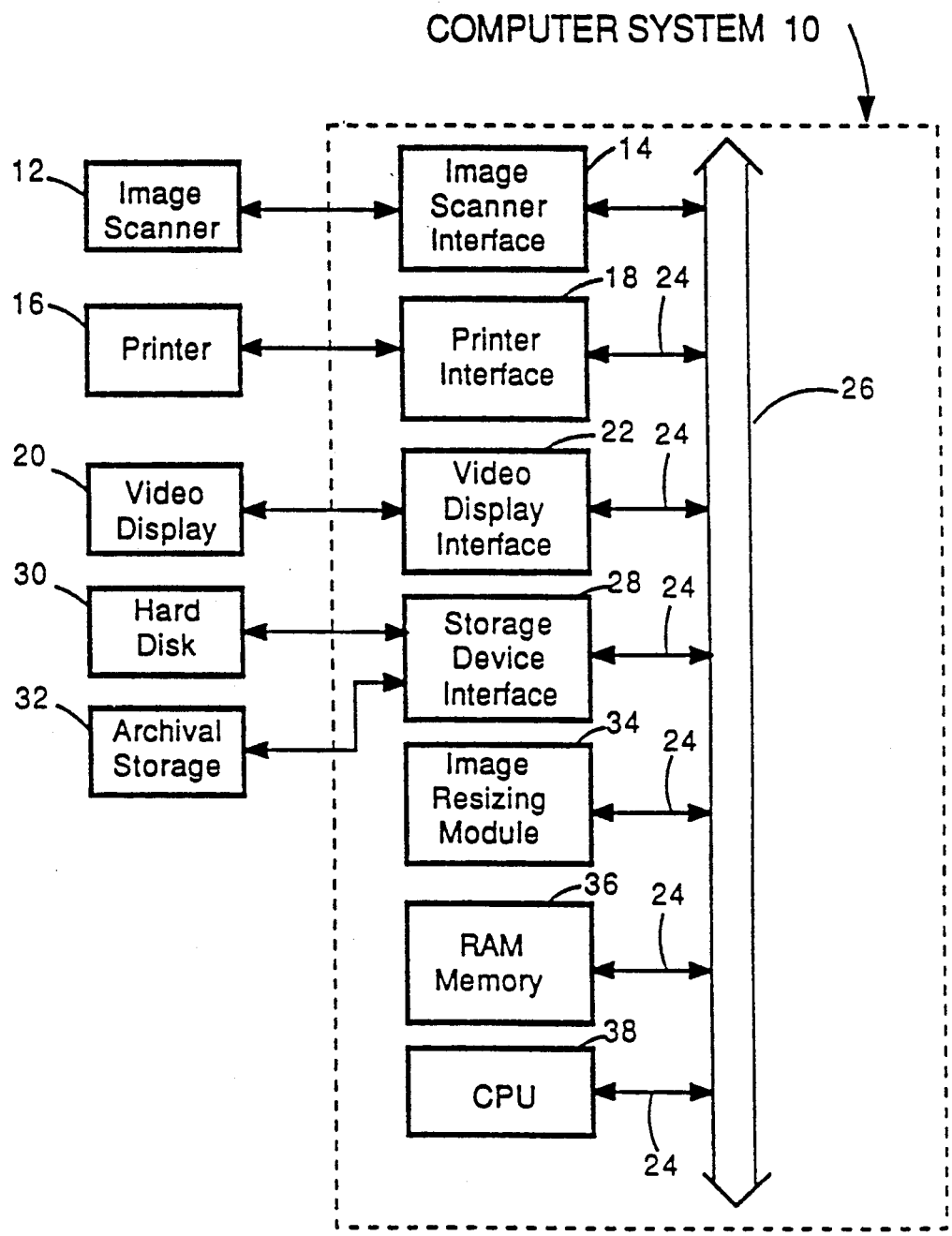
FIG. 3 is a block diagram showing the overall system for designing a filter and applying the filter to resize an image of the present invention.

The method of designing a filter for resizing an input image also comprises the step of storing the resized image in an output memory device. This step is shown in block H in FIG. 2. Such output memory device may include a random access memory (RAM), such as RAM 36 shown in FIG. 3, or a hard disk 30 or archival storage 32 as shown in FIG. 3. Archival storage 32 is typically a tape, a floppy disk or an optical disc. Alternatively, the image may be stored on a piece of photographic or X-ray film. In addition, the first and second sets of coefficients vectors $\overline{H}_{c1}$ and $\overline{H}_{c2}$, respectively, and the first set of coefficient matrices $\overline{H}_{jk}$ may be stored in the output memory device.

FIG. 3 is a schematic view of a computer system which is utilized to design and apply the filter of the present invention. As shown in FIG. 3, computer system 10 includes an image scanner 12, which is an input memory device which stores the input image. An image scanner interface 14 feeds the input image from image scanner 12 and puts the input image, comprising a plurality of input pixels, on a data bus 26 via connections 24 and into RAM 36 or onto a disk or tape of hard disk 30 or archival storage 32 through a storage device interface 28. An image resizing module 34 performs the image resizing (i.e., interpolation or decimation). The resized image may also be stored in RAM 36 or on disk or tape of hard disk 30 or archival storage 32. From hard disk 30 or archival storage 32, the resized image can be fed back through an appropriate interface 18 or 22, respectively, to a printer 16 or a video display 20 as shown in FIG. 3. Image resizing module 34, storage device interface 28, printer interface 18 and video display interface 22 are also connected to data bus 26 by connections 24. A central processing unit (CPU) is connected to bus 26 for processing the data of system 10.

In the method of the present invention, to check if an appropriate number of elements $M_1$ and $M_2$ in the input kernel has been chosen, a first and a second window transition band $\Delta f_1$ and $\Delta f_2$ for the first and second senses are selected. The window transition bands, $\Delta f_1$ and $\Delta f_2$, are expressed in terms of $A_{r1}$ and $A_{r2}$ and window length, $N_{w1}$ and $N_{w2}$.

$$\Delta f_1 = \frac{A_{r1} \, 7.95}{14.36(N_{w1} - 1)} \text{ and } \Delta f_2 = \frac{A_{r2} \, 7.95}{14.36(N_{w2} - 1)}$$

In the interpolation-dominant case, $M_1$ and $M_2$ are chosen as a function of a stopband attenuation $A_{r1}$ and $A_{r2}$, respectively, and a minimum filter length $N_{f1MIN}$ and $N_{f2MIN}$, respectively, which are described as:

$$N_{f1MIN} = \frac{A_{r1} \text{ (dB)}}{20\Delta f_1} I_2 \text{ and } N_{f2MIN} = \frac{A_{r2} \text{ (dB)}}{20\Delta f_2} I_2$$

In the decimation-dominant case, $M_1$ and $M_2$ are computed as a function of the filter attenuation $A_{r1}$ and $A_{r2}$, respectively, and a minimum filter length $N'hd$ $f_{1MIN}$ and $N'_{f2MIN}$, respectively, which are described as:

$$N'_{f1MIN} = \frac{A_{r1} \text{ (dB)}}{20\Delta f_1} D_1 \text{ and } N'_{f2MIN} = \frac{A_{r2} \text{ (dB)}}{20\Delta f_2} D_2$$

The above method represents the ideal version for interpolation and decimation of an image. Alternatively, a pixel-replicating method may be designed. The choice of a pixel-replicating filter is designated by decision diamond F in FIG. 2. In the pixel-replicating version, the first set of coefficient vectors is modified in the first sense by identifying the output pixels exactly aligning with the input pixels. The values of the first set of coefficient vectors corresponding to the output pixels aligning exactly with the input pixels are then identified. The values of the first set of coefficient vectors are then modified so that the aligned new pixels each have a value equal to the value of the corresponding input pixel. The values of the second set of coefficient vectors corresponding to the output pixels aligning exactly with the input pixels are then identified and are modified so that the aligned output pixels each have a value equal to the value of the corresponding input pixel. This step is shown in block G in FIG. 2.

The filter created by the pixel-replicating version of the present invention may be applied either in a two-pass or a one-pass case. In the two-pass case, the first set of coefficient vectors is applied to the neighborhood of the values of the input pixels in the first sense and the second set of coefficient vectors is applied in the second sense to the neighborhood of the values of the set of pixels resulting from applying the first set of coefficient vectors to the input pixels in the first sense. Alternatively, in the one-pass case, the first and second sets of coefficient vectors are combined into a first set of coefficient matrices and the first set of coefficient matrices is applied to the neighborhood of the values of the input pixels simultaneously in the first and second senses.

It should be noted that the above method of designing a filter may be implemented in either hardware or software. Also, the above method may be extended to N senses, other than the two senses as described above, where N is a positive integer. In such circumstances, a pixel is defined as a picture element in N dimensions.

Figure 4:
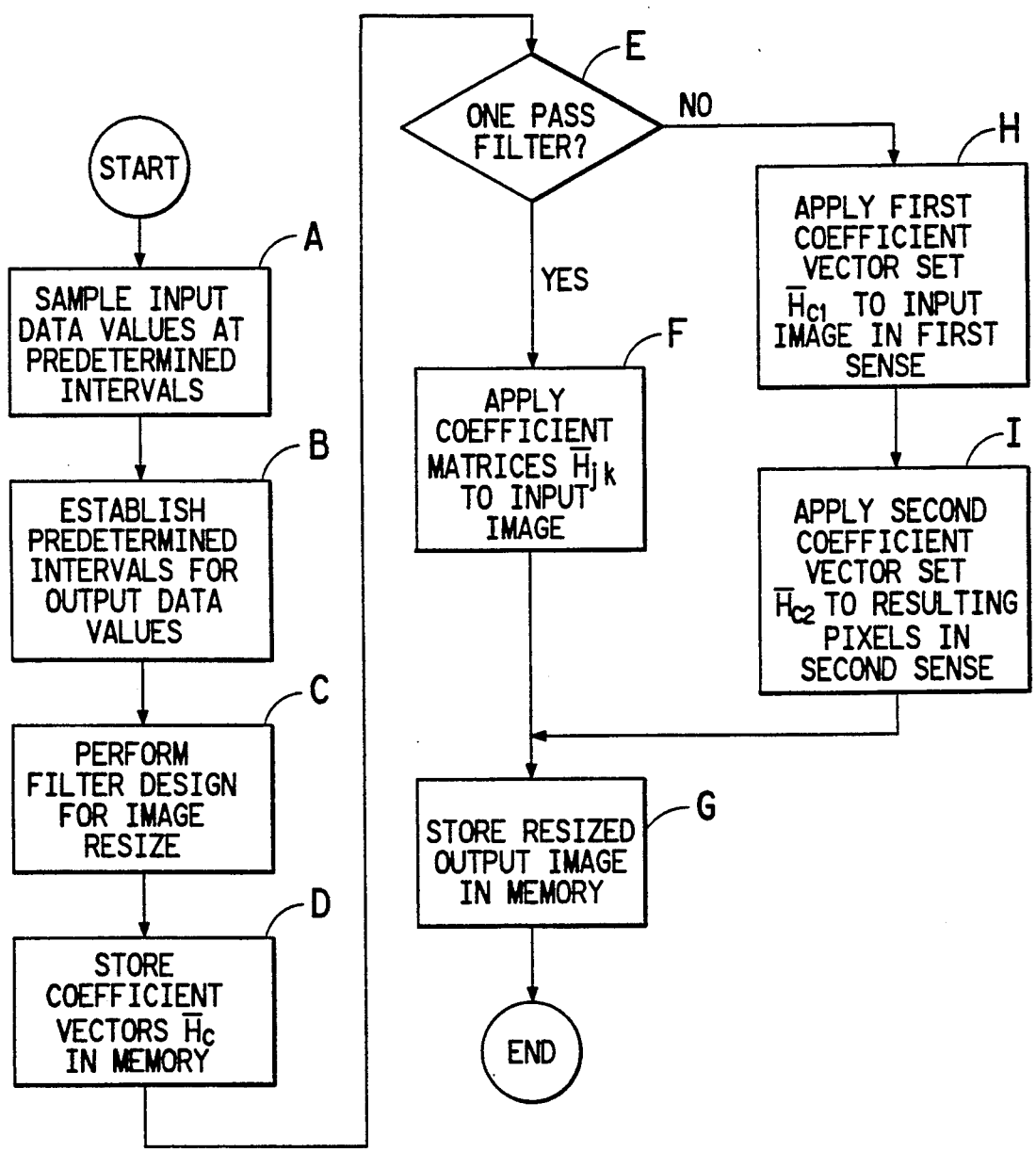
FIG. 4 is a flowchart of the method for resizing an image by applying the filter designed in accordance with the filter design method of the present invention.

Further in accordance with the present invention there is provided a method of resizing an input image comprising a plurality of input pixels to generate a resized image comprising a plurality of corresponding output pixels while preserving the information content of the input image. The steps of the method are shown in FIG. 4. The method comprises the steps of sampling the input image at a predetermined first interval in a first sense and at a predetermined second interval in a second sense for producing a plurality of input data values of the locations of each of the input pixels. This step is shown in block A in FIG. 4. The sampled data values of the input pixels are then stored in a memory device, such as RAM 36, disc 30 or archival storage 32 shown in FIG. 3. A predetermined third interval is established in the first sense and a predetermined fourth interval is established in the second sense for producing a plurality of output data values of the locations of each of the output pixels. This step is shown in block B in FIG. 4.

A filter is then designed in accordance with the method of designing a filter as described above, and the coefficient vectors are obtained. This step is shown in block C in FIG. 4. The coefficient vector sets are stored in an output memory as shown in block D in FIG. 4. The output memory may be RAM 36, disc 30 or archival storage 32 as shown in FIG. 3. The input image is obtained from an input memory which may be image scanner 12 as shown in FIG. 3.

The input image may be resized with either a one-pass or a two-pass filter. Decision diamond E in FIG. 4 asks whether a one-pass filter is applied. In the one-pass case, the first and second sets of coefficient vectors are applied to a neighborhood of the values of the input pixels adjacent each output pixel to compute the value of each output pixel, and the computed value is assigned to a corresponding output pixel, thereby producing a resized image. This step is shown in block F of FIG. 4. If the one-pass case is not applied, (i.e., the two-pass case) then first coefficient vector set $\bar{H}_{c1}$ is applied to a neighborhood of the values of the input pixels adjacent each output pixel to obtain a resulting set of pixels as shown in block H of FIG. 4, and second coefficient vector set $\bar{H}_{c2}$ is applied to the resulting set of pixels to compute the value of each output pixel. The computed value is assigned to a corresponding output pixel as shown in block I of FIG. 4. In either case, the resized image is then stored in the output memory, such as RAM 36, disc 30 or archival storage 32 as shown in FIG. 3. This step is designated by block G in FIG. 4.

It should be noted that the above-described method of resizing an input image may be implemented either in hardware or in software. In addition, the above-described method may be extended to N senses other than two as described above, where N is a positive integer. In such circumstances, a pixel is defined as a picture element in N dimensions.

The method of designing a filter of the present invention will be further clarified by the following examples, which are intended to be purely exemplary of the invention.

EXAMPLE 1

Integer Interpolation (R=1)

In this example, the resize ratio was selected to be equal to one (I=5 and D=1) for an interpolation-dominant image expansion. Choosing the attenuation, $A_r$=60 dB and a 50% alias-free bandwidth gave the minimum filter length $N_{fMIN}$ of 20. Selecting an input kernel of M=4 pixels yielded a composite filter length of 21, exceeding the minimum criteria. The cutoff frequency was computed to be $f_c$=0.1 normalized Hertz (a function of I), and the sharpness factor, $F_s$, was set to 1 to produce an ideal filter. A Kaiser window FIR lowpass filter of length 17 was designed using the Kaiser Window sequence with $\beta$=5.6533, where the Kaiser window sequence $w_k(n)$ was:

$w_k(n)$=[0.0204 0.0806 0.1842 0.3302 0.5061 0.6891
0.8501 0.9606 1.000 0.9606 0.8501 0.6891 0.5061
0.3302 0.1842 0.0806 0.0204]

The standard "FIR1" (MATLAB function call, commercially available from The Mathworks, Inc. of South Natick, Mass.) filter design algorithm yielded a lowpass Kaiser window filter described by coefficient vector:

$W_f(n)$=[−0.0008 −0.0035 0.0058 0.0000 0.0241
0.0707 0.1309 0.1828 0.2034 0.1828 0.1309 0.0707
0.0241 0.0000 −0.0058 −0.0035 −0.0008]

Figure 5:
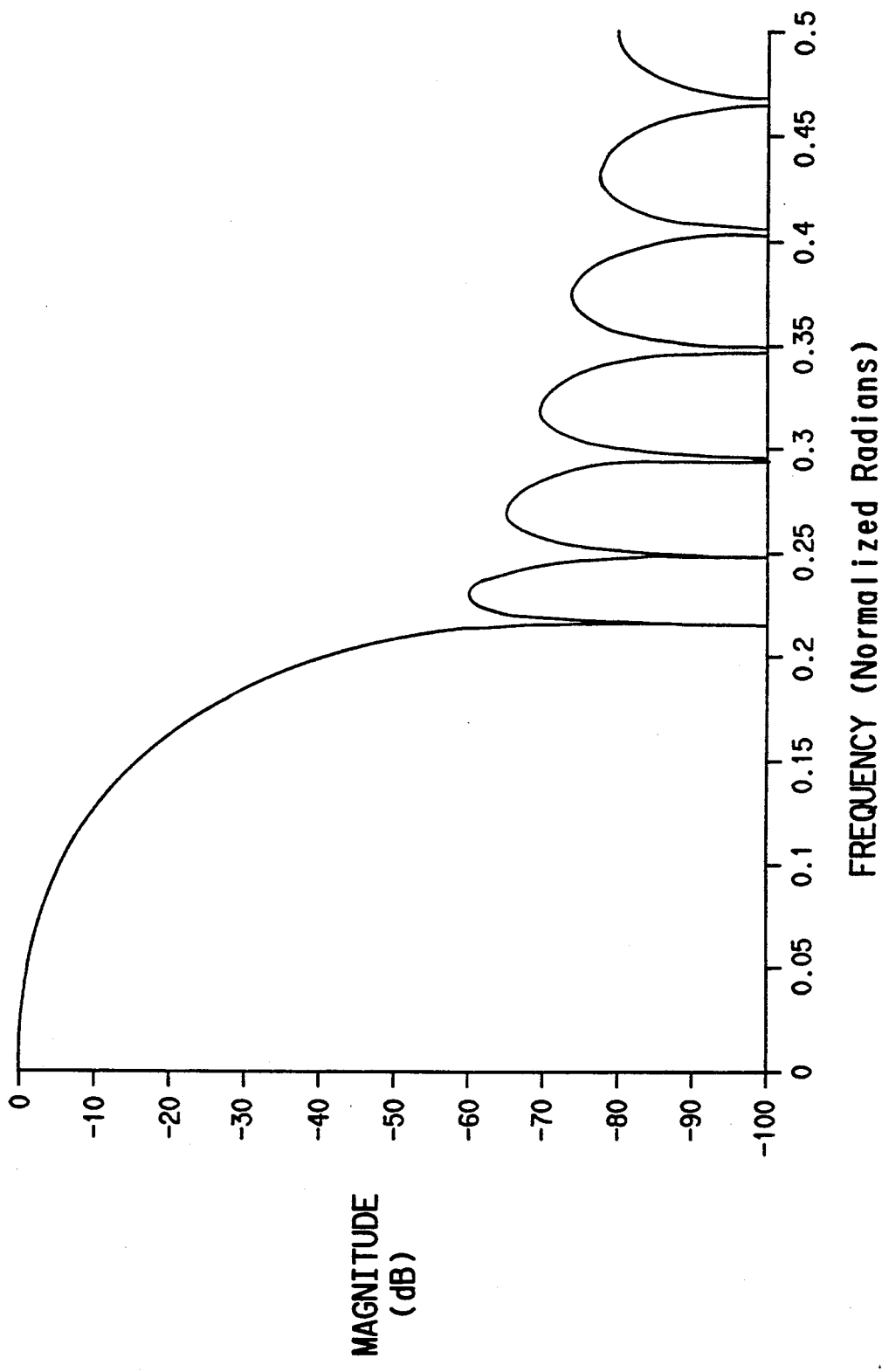
FIG. 5 is a graph showing the frequency response of a standard FIR1 Kaiser window low-pass filter of the prior art and as described in Example 1.

The frequency response of this standard filter design is shown in FIG. 5.

The vector p(n) for a given sense was formed as:

p(n)=[1 1 1 1 1]

Convolution of $w_f(n)$ with p(n) yielded a modified lowpass filter with a coefficient vector h(n):

$h(n)$=[−0.0008 −0.0043 −0.0102 0.0139 0.0854
0.2198 0.4085 0.6119 0.7706 0.8308 0.7706 0.6119
0.4085 0.2198 0.0854 0.0139 −0.0102 −0.0102
−0.0043 −0.0008]

Figure 6:
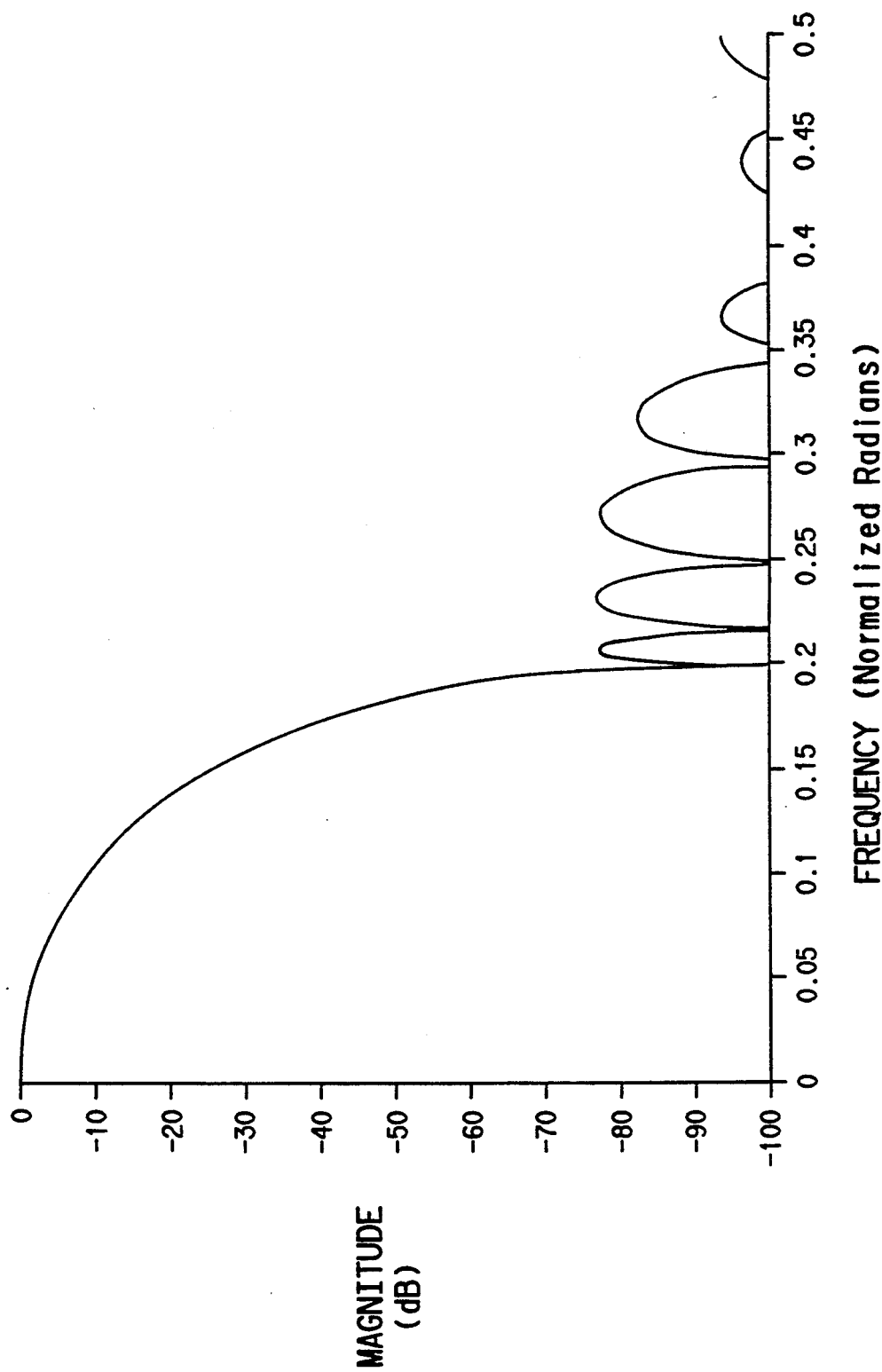
FIG. 6 is a graph showing the frequency response of the modified Kaiser window filter of the ideal version of the filter design method of the present invention as described in Example 1.
Figure 7:
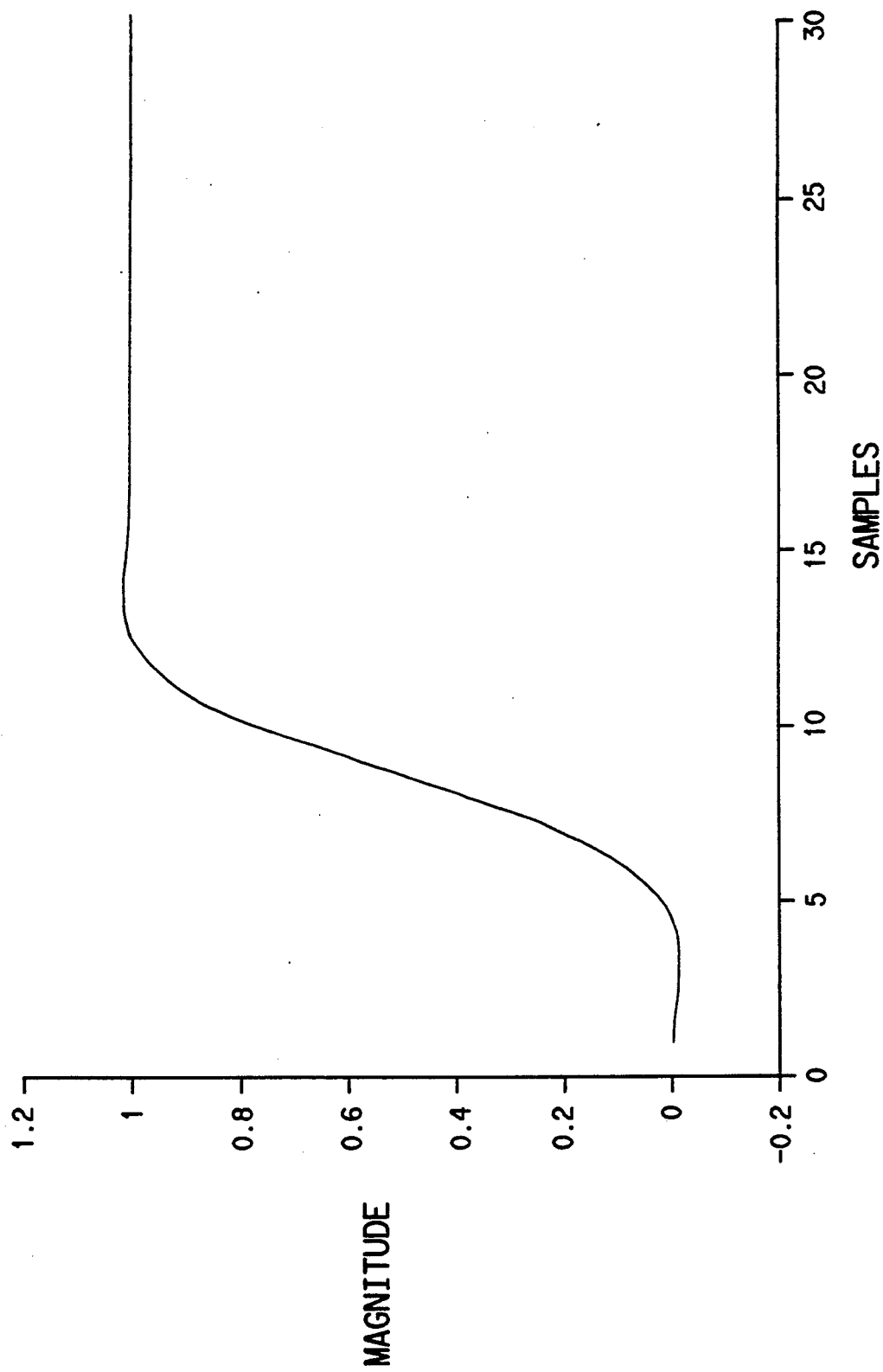
FIG. 7 is a graph showing the unit step response of the modified Kaiser window filter of the ideal version of the filter design method of the present invention as described in Example 1.

It is noted that h(n) always has unity gain and minimal overshoot for constant inputs. However, the duplication of pixels is not quaranteed because h(11) is not 1, and h(1), h(6) and h(16) are not all zeros. For comparative purposes, the frequency and unit step responses of the modified filter are plotted in FIGS. 6 and 7 in the time domain.

For the ideal modified Kaiser window design, it can be seen that the frequency response provides excellent attenuation in the stopband. The step response shows almost no undershoot or overshoot (on the order of 0.8%). There is more rolloff in the pass band of this example than that achieved by the cubic spline method, which causes more attenuation and smoothing of the image.

A first set of coefficient vectors representing a polyphase (i.e., two-pass) interpolating filter was then created. By choosing the coefficients that map to the proper output pixel position, the resulting vectors, in matrix form, were:

$$\bar{H}_c = \begin{bmatrix} \bar{h}_1 \\ \bar{h}_2 \\ \bar{h}_3 \\ \bar{h}_4 \\ \bar{h}_5 \end{bmatrix} = \begin{bmatrix} 0.0854 & 0.8308 & 0.0854 & -0.0008 \\ 0.0139 & 0.7706 & 0.2198 & -0.0043 \\ -0.0102 & 0.6119 & 0.4085 & -0.0102 \\ -0.0102 & 0.4085 & 0.6119 & -0.0102 \\ -0.0043 & 0.2198 & 0.7706 & 0.0139 \end{bmatrix}$$

A similar process was followed to generate a second set of coefficient vectors. The filters were applied in a two-pass mode. The input pixel kernel was processed in one sense with the first polyphase filter. The intermediate results were then processed in the second sense with the second polyphase filter. The process was a discrete convolution of the input pixels or intermediate results with the filter coefficients corresponding to the desired output pixel locations.

An alternative filtering application was used to combine vectors into a set of coefficient matrices representing a two-dimensional polyphase filter. The vector product was used to generate a matrix of coefficients for each interpolated output pixel:

$$\bar{H}_{jk} = \bar{h}_j T \bar{h}_k \text{ for } \begin{array}{l}(j = 1,2,\ldots,I) \\ (k = 1,2,\ldots,I)\end{array}$$

For example, a coefficient matrix for the first output pixel for R=5 in both directions was:

$$\bar{H}_{11} = \begin{bmatrix} 0.0073 & 0.0710 & 0.0073 & -0.0001 \\ 0.0710 & 0.6901 & 0.0710 & -0.0007 \\ 0.0073 & 0.0710 & 0.0073 & -0.0001 \\ -0.0001 & -0.0007 & -0.0001 & 0.0000 \end{bmatrix}$$

This matrix was applied in a one-pass, two-dimensional filter mode. In this case, twenty-five 4×4 matrices were produced, one for each output pixel.

In the ideal case, input pixels are not necessarily replicated at the overlapping pixel location. To preserve the input data, a pixel-replicating form of the Kaiser window filter was designed by forcing the coefficients for the interpolation point at the input pixels to be one at that location and zero elsewhere. A set of coefficient vectors h(n) for a one-dimensional, pixel-replicating filter was:

$$H(a)=[-0.0008 -0.0043 -0.0102 -0.012\ 0.0139\ 0 \\ 0.2198\ 0.4085\ 0.6119\ 0.7706\ 1.0000\ 0.7706\ 0.6119 \\ 0.4085\ 0.2198\ 0\ 0.0139\ -0.012\ -0.012\ -0.0043\ 0]$$

which was converted to the polyphase filter:

$$\bar{H}_c = \begin{bmatrix} \bar{h}_1 \\ \bar{h}_2 \\ \bar{h}_3 \\ \bar{h}_4 \\ \bar{h}_5 \end{bmatrix} = \begin{bmatrix} 0 & 1 & 0 & 0 \\ 0.0139 & 0.7706 & 0.2198 & -0.0043 \\ -0.0102 & 0.6119 & 0.4085 & -0.0102 \\ -0.0102 & 0.4085 & 0.6119 & -0.0102 \\ -0.0043 & 0.2198 & 0.7706 & 0.0139 \end{bmatrix}$$

Figure 8:
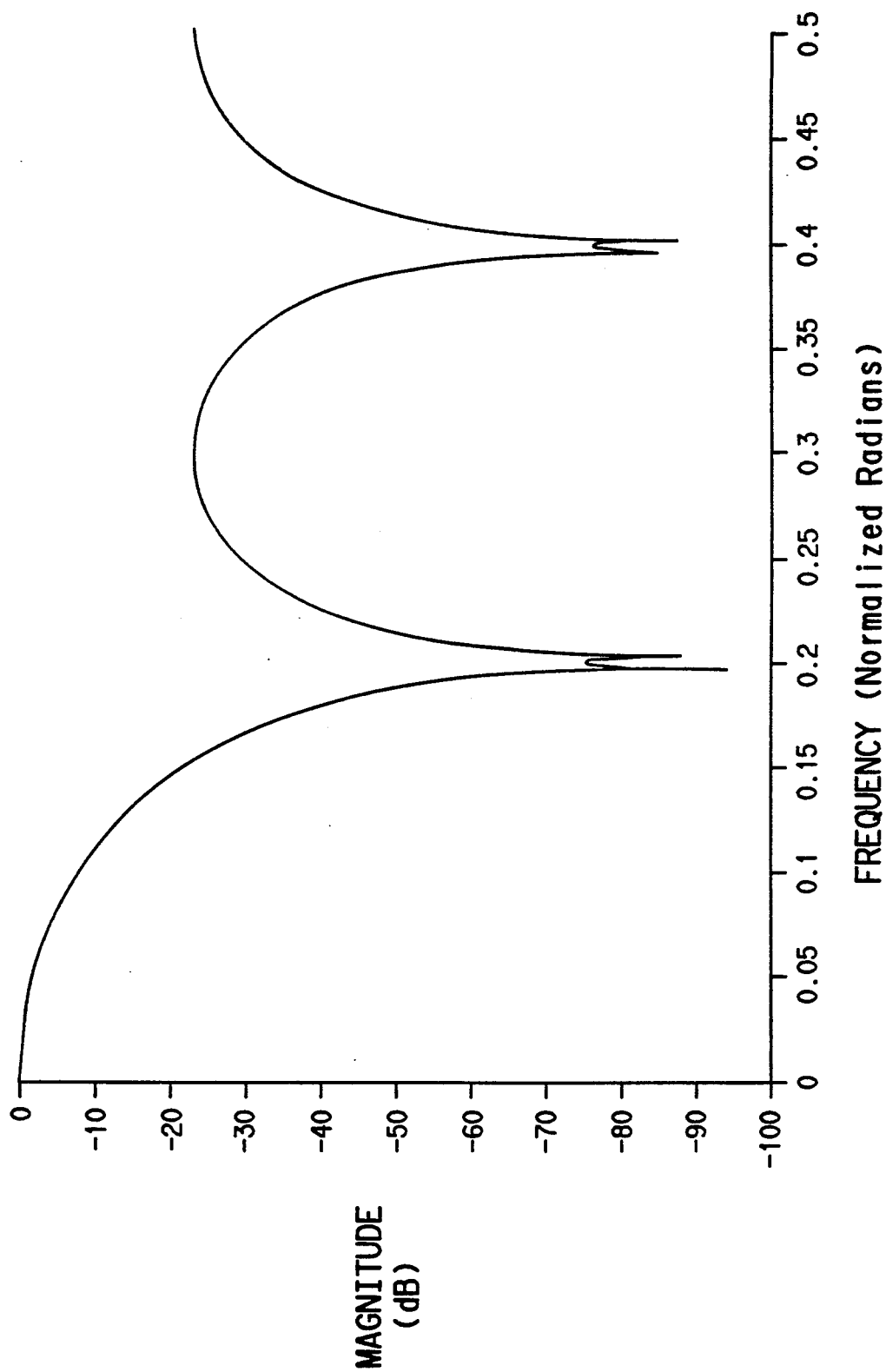
FIG. 8 is a graph showing the frequency response of the modified Kaiser window filter of the pixel-replicating version of the filter design method of the present invention as described in Example 1.
Figure 9:
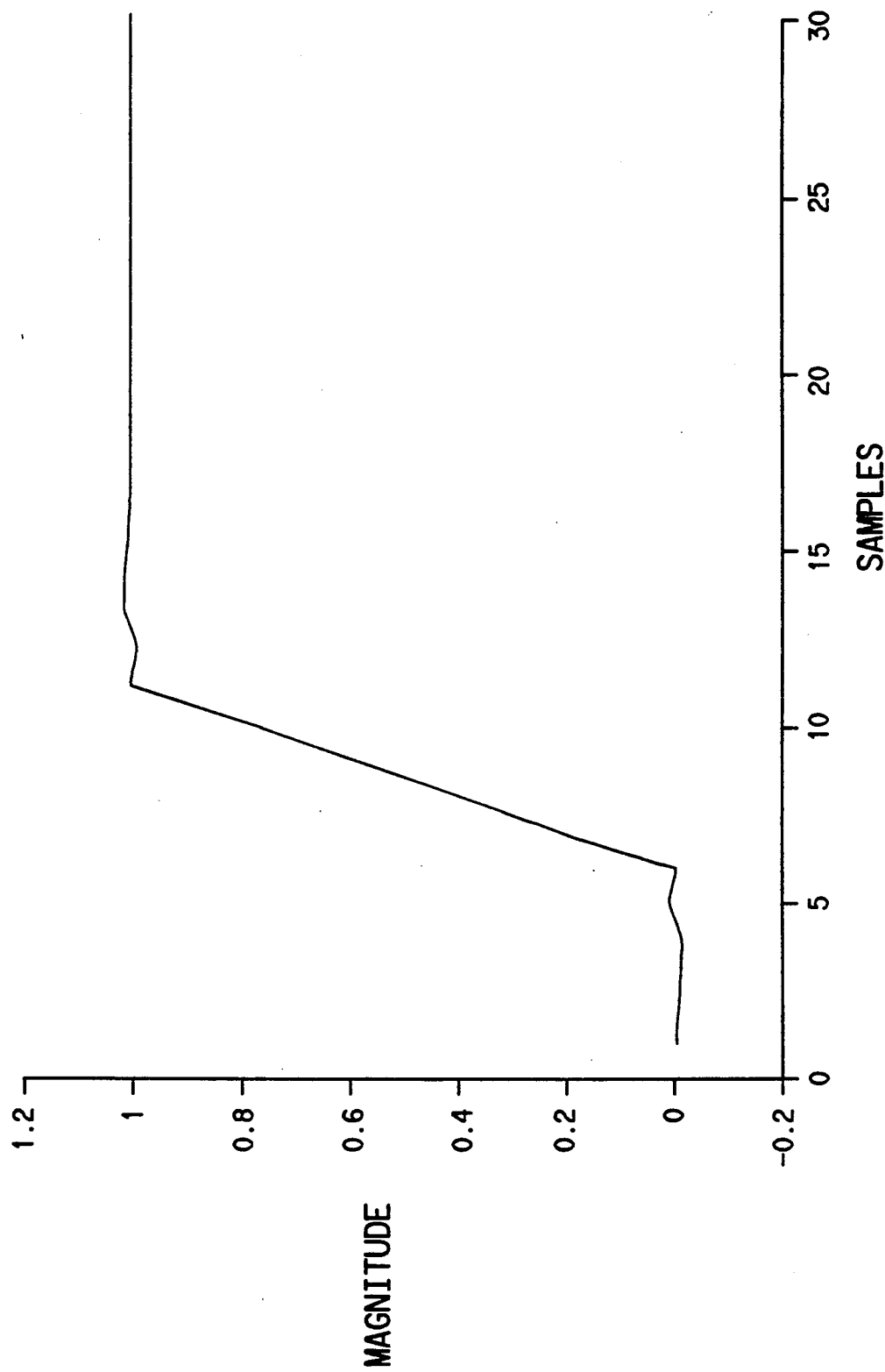
FIG. 9 is a graph showing the unit step response of the modified Kaiser window filter of the pixel-replicating version of the filter design method of the present invention as described in Example 1.

The frequency and step responses are plotted for the pixel-replicating filter in FIGS. 8 and 9.

Several important differences between the ideal and pixel-replicating cases are noted. The stopband attenuation is much less for the pixel-replicating filter. Also, there is a degree of oscillation in the step response (~2%).

The performance of the pixel-replicating filter is superior to that of the cubic spline, in the sense that the undershoot and overshoot will introduce minimal distortion. The design in this Example was restricted to a filter that uses only four data points per row. A kernel size of 8×8 may improve overall filter characteristics, but it will also widen the region of influence that far neighboring pixels have on the center kernel of interpolated pixels. A larger kernel also requires computations on the order of $M_1 \times M_2$. A hardware implementation of the convolution algorithm can be realized for a 4×4 input kernel with a minimum of memory for coefficient sets, multipliers, and adders.

EXAMPLE 2

Non-integer Expansion (R=I/D, I>D>1)

Figure 10:
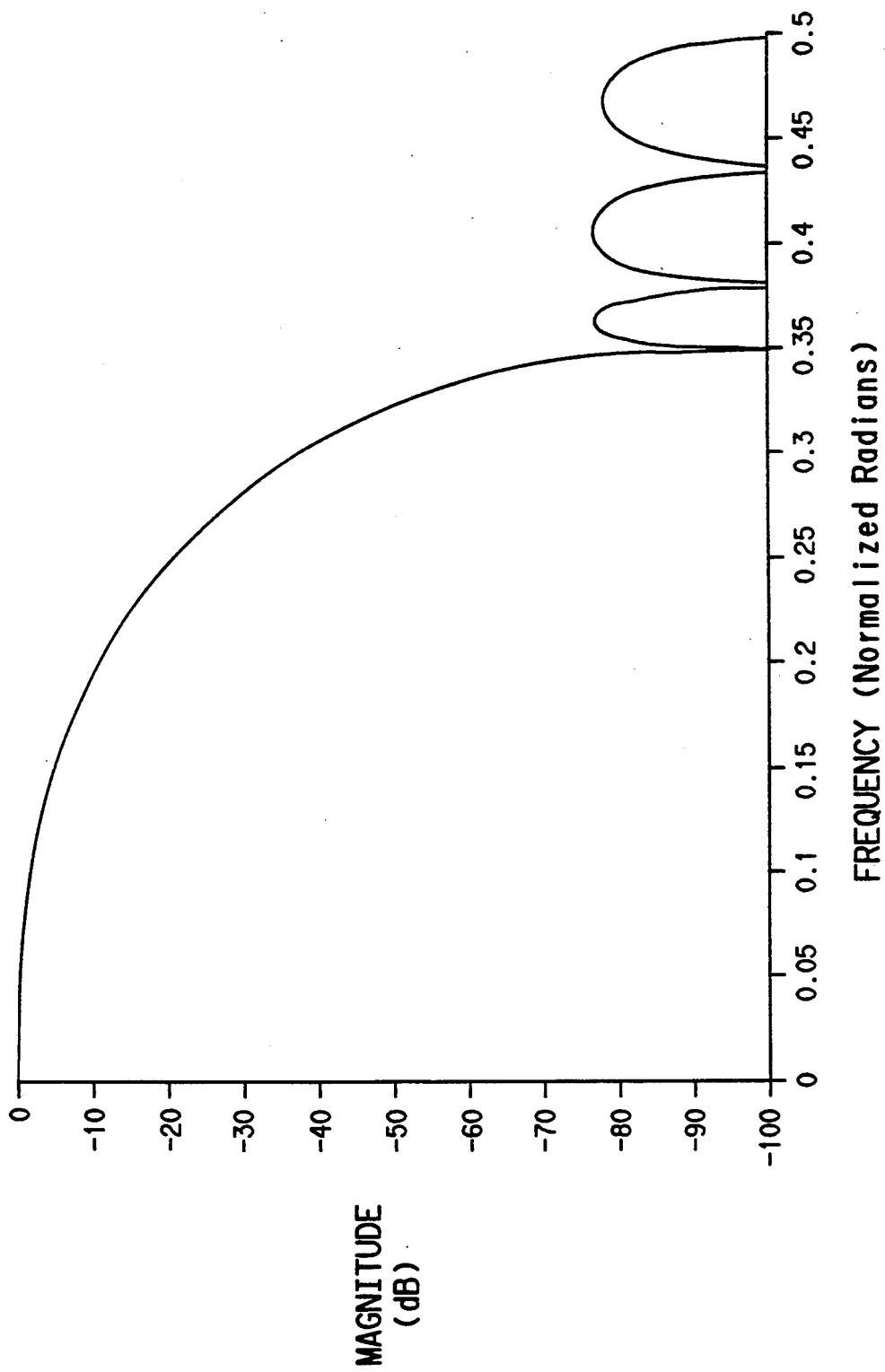
FIG. 10 is a graph showing the frequency response of a standard FIR1 Kaiser window low-pass filter of the prior art and as described in Example 2.

For non-integer ratios greater than one, a filter based on the interpolation rate was designed as in Example 1. The cutoff frequency of the filter required for interpolation was less than that for the decimating filter. Therefore, the filter designed for integer interpolation was sufficient. In this example, the resize ratio was selected to be 1.33333=4/3 where the interpolation rate, I, Was selected to be 4 and the decimation rate, D, was selected to be 3. Choosing the attenuation, $A_r$=80dB and a 50% alias-free bandwidth gave a minimum filter length of 16. Selecting an input kernel of M=4 first pixels yielded a composite filter length of 17, meeting the minimum criteria The cutoff frequency was computed to be $f_c$=0.125 normalized Hertz (a function of I). The sharpness factor, $F_s$, was set to 1.25 to produce a filter with a sharper step transition and a cutoff frequency of 0.156. A Kaiser window FIR low-pass filter of length 14 was designed using the Kaiser window sequence with $\beta$=7.857. The filter frequency response of $w_f(n)$ is plotted in FIG. 10.

As in example 1, the vector p(n) for a given sense was formed as:

p(n)=[1 1 1]

Convolution of $w_f(n)$ with p(n) yielded a modified low-pass filter with a coefficient vector:

$$h(n)=[0.0000 -0.0016 -0.0107 -0.0192\ 0.0274 \\ 0.2044\ 0.5107\ 0.8164\ 0.9453\ 0.8164\ 0.5107\ 0.2044 \\ 0.0274 -0.0192 -0.0107 -0.0016\ 0.0000]$$

Figure 11:
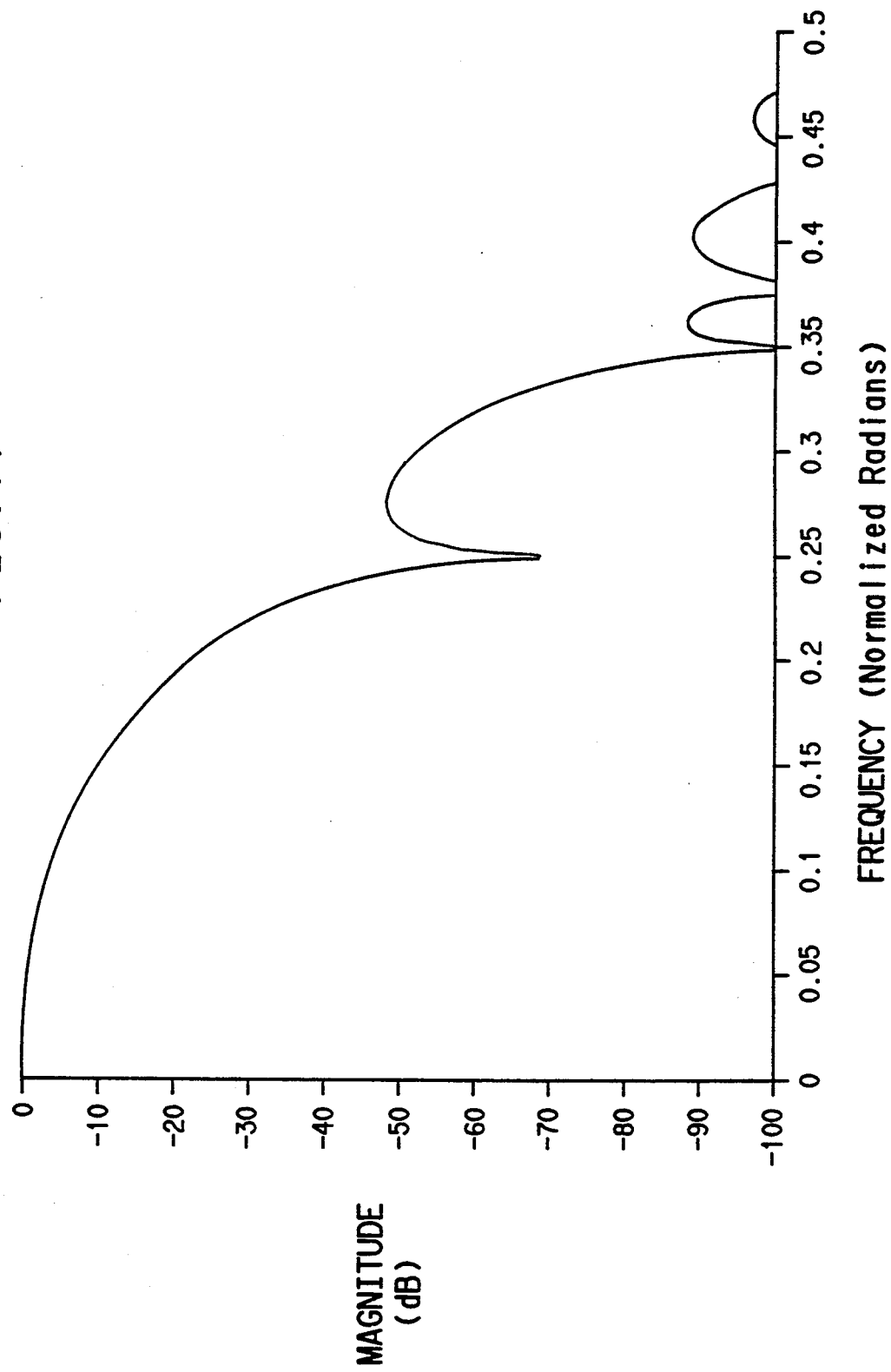
FIG. 11 is a graph showing the frequency response of the modified Kaiser window filter of the ideal version of the filter design method of the present invention as described in Example 2.
Figure 12:
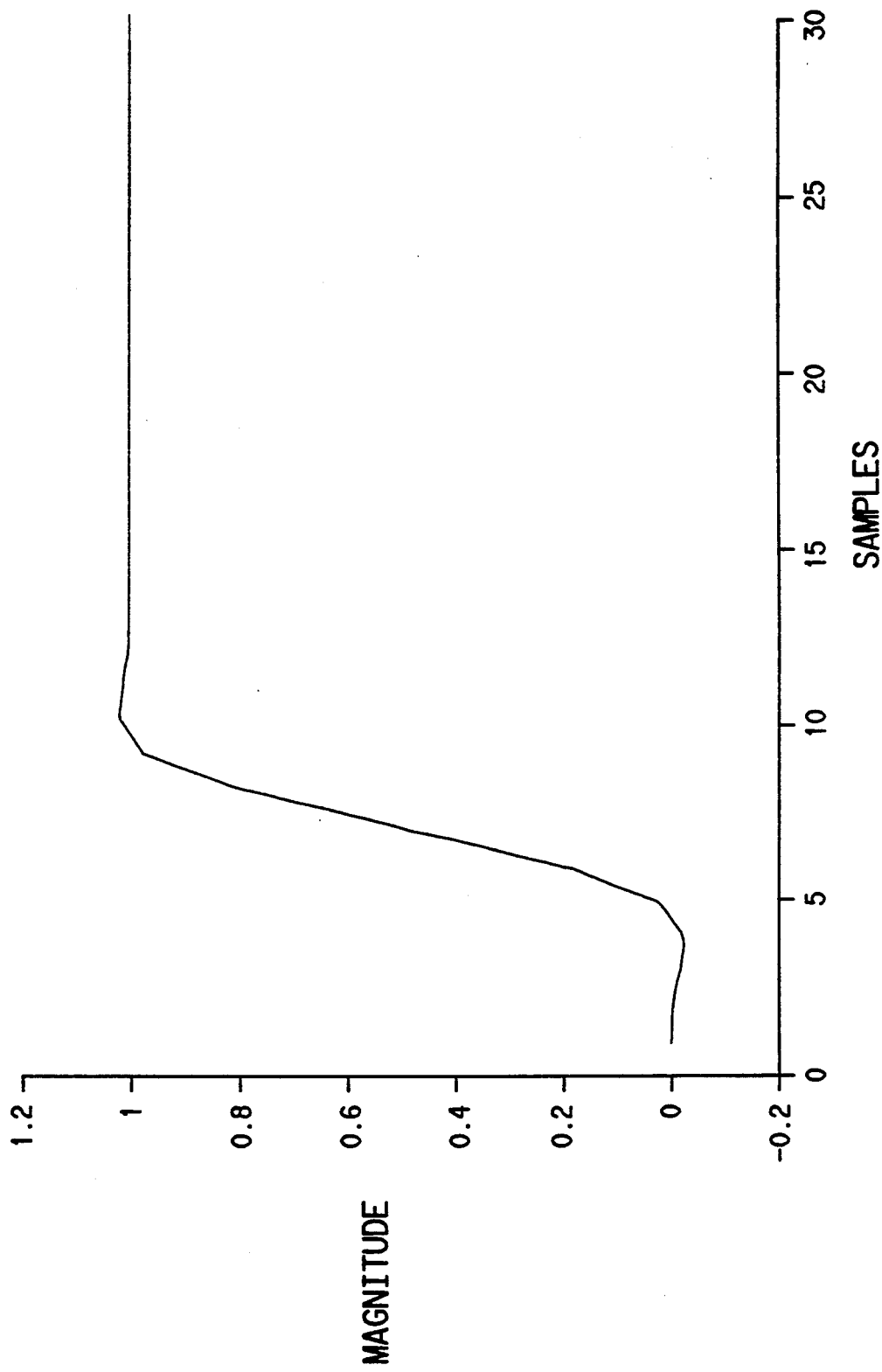
FIG. 12 is a graph showing the unit step response of the modified Kaiser filter window of the ideal version of the filter design method of the present invention as described in Example 2.

The frequency and step responses of h(n) are plotted in FIGS. 11 and 12.

The step response as plotted in FIG. 11 shows that the sharpness factor, by extending the filter cutoff frequency, yields more overshoot in the transition region. The sharpness factor can thus be used to affect image appearance in intensity or color transition regions. The resultant polyphase filter was constructed by mapping the coefficient vector h(n) to the appropriate output pixel coefficient vectors:

$$\bar{H}_c = \begin{bmatrix} \bar{h}_1 \\ \bar{h}_2 \\ \bar{h}_3 \\ \bar{h}_4 \end{bmatrix} = \begin{bmatrix} 0.0274 & 0.9453 & 0.0274 & -0.0016 \\ -0.0192 & 0.8164 & 0.2044 & -0.0043 \\ -0.0107 & 0.5107 & 0.5107 & -0.0107 \\ -0.0016 & 0.2044 & 0.8164 & -0.0192 \end{bmatrix}$$

A pixel-replicating version of the filter was computed in the same way as Example 1, producing the coefficient vectors:

$$\bar{H}_c = \begin{bmatrix} \bar{h}_1 \\ \bar{h}_2 \\ \bar{h}_3 \\ \bar{h}_4 \end{bmatrix} = \begin{bmatrix} 0 & 1 & 0 & 0 \\ -0.0192 & 0.8164 & 0.2044 & -0.0043 \\ -0.0107 & 0.5107 & 0.5107 & -0.0107 \\ -0.0016 & 0.2044 & 0.8164 & -0.0192 \end{bmatrix}$$

Figure 13:
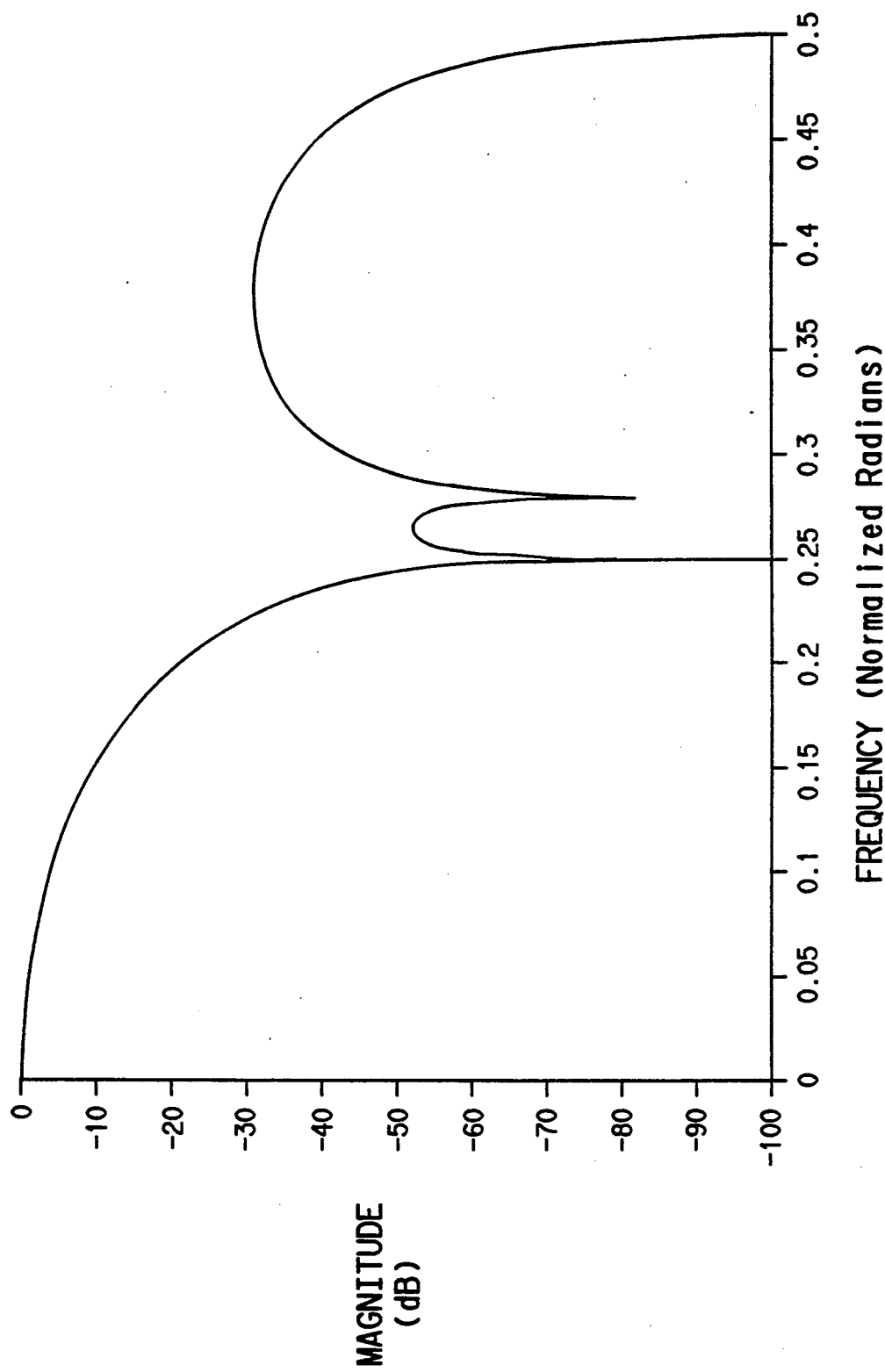
FIG. 13 is a graph showing the frequency response of the modified Kaiser window filter of the pixel-replicating version of the filter design method of the present invention as described in Example 2.
Figure 14:
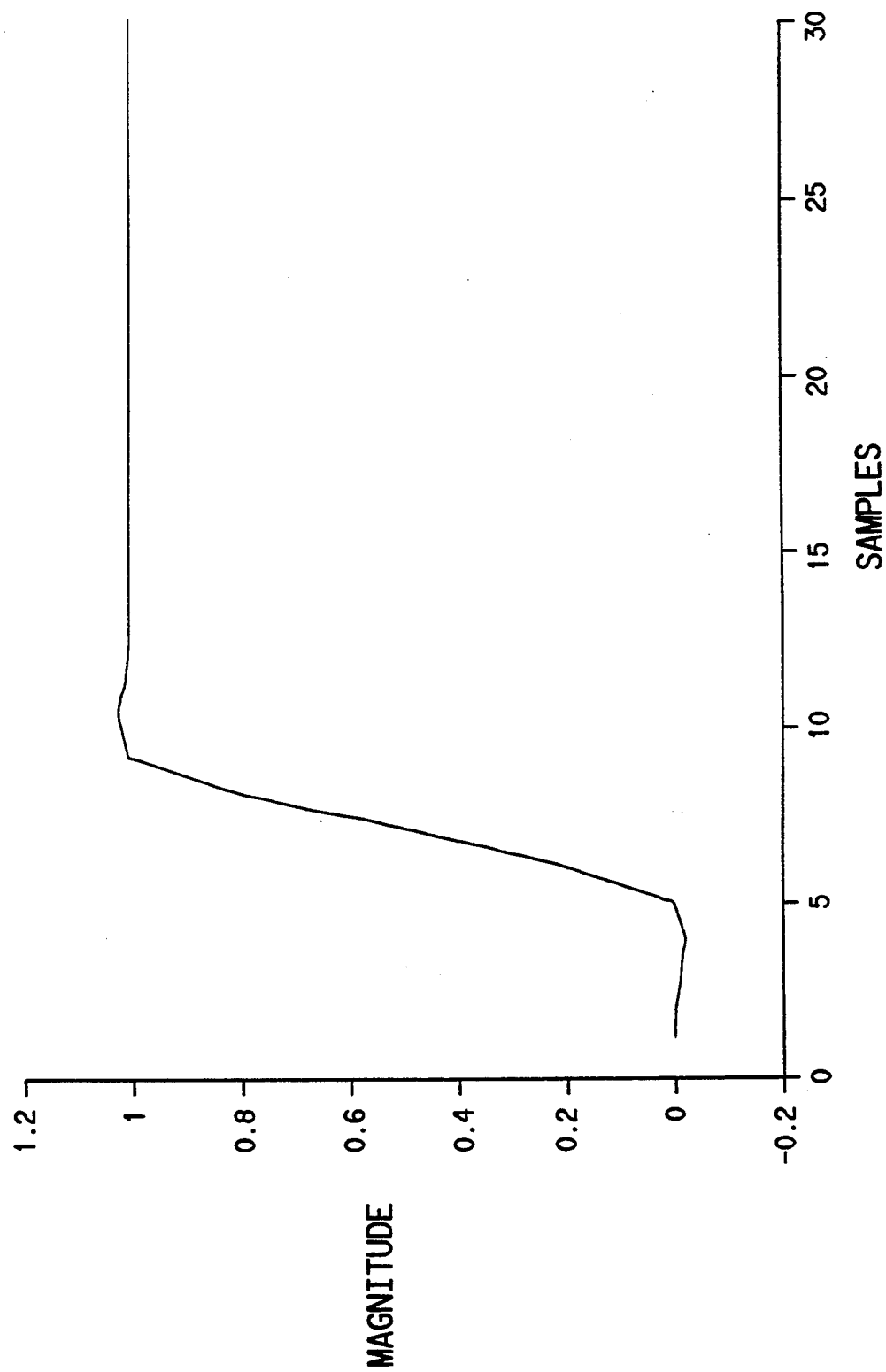
FIG. 14 is a graph showing the unit step response of the modified Kaiser window filter of the pixelreplicating version of the filter design method of the present invention as described in Example 2.

The frequency and step responses are plotted in FIGS. 13 and 14.

Figure 15:
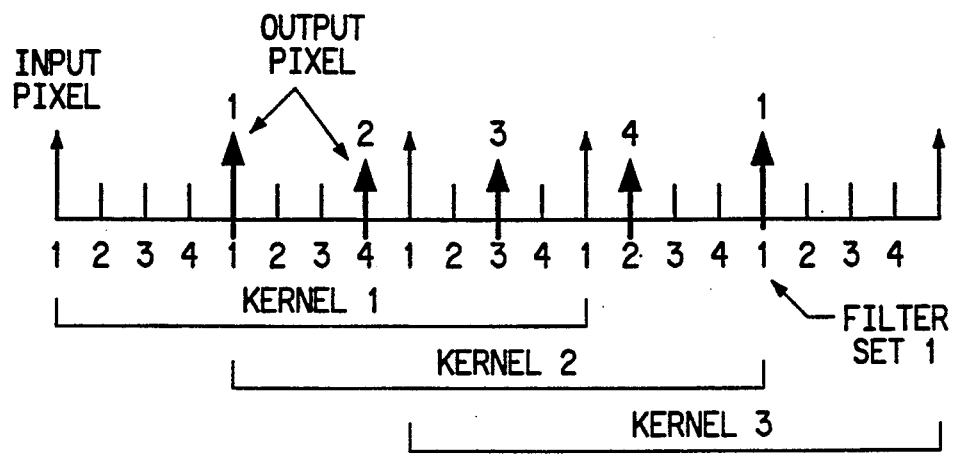
FIG. 15 is a graphic illustration showing how the method of designing a filter of the present invention applied in one sense selects a coefficient vector as a function of an output pixel mapped to an input space, and which input kernel is appropriate for the computation of the output pixels for Example 2.

In the two-pass case of the filtering operation, the method of the present invention created the coefficient vectors as a function of an output pixel mapped to an input space, and as a function of which input kernel is appropriate for the computation of the output pixel. FIG. 15 illustrates this process in one dimension. As shown in FIG. 15, output points are located at interpolation fractional locations in the center of the input kernel. The filter selection order operates in the pattern below.

$$1\,II{-}1\,I{-}2\ldots 2$$

More than one output pixel may be computed in the first kernel, and the last kernel does not compute an output pixel. The computational repeats after D kernel shifts. Modulo-type calculations can be done to determine if an output pixel lies within the input kernel space, and when to shift the input kernel.

EXAMPLE 3

Integer Decimation (R = 1/D, I = 1)

For the case of integer decimation, the image was reduced in one sense. A single low-pass filter was designed to process the data at the input sample rate. In this example, the resize ratio R was selected to be ⅓ and the decimation rate was selected to be 3. Choosing the attenuation, $A_r = 80$ dB and a 50% alias-free bandwidth, the minimum input kernel was computed to be M = 12. The minimum filter length was 12. A kernel of 12 yielded a composite filter length of 13, exceeding the minimum criteria. The cutoff frequency was computed to be $f_c = 0.166667$ normalized Hertz (a function of D), and the sharpness factor, $F_s$, was set to 1 to produce an ideal filter. A Kaiser window FIR low-pass filter of length 13 was designed using the Kaiser window sequence with $\beta = 7.857$. The design of the filter was performed as Example 1, resulting in one coefficient vector $h_1$:

$h_1 = [-0.0023\ -0.0000\ 0.0920\ 0.2523\ 0.3381\ 0.2523$
$0.0920\ 0.0000\ -0.0110\ -0.0023\ -0.0000]$

Figure 16:
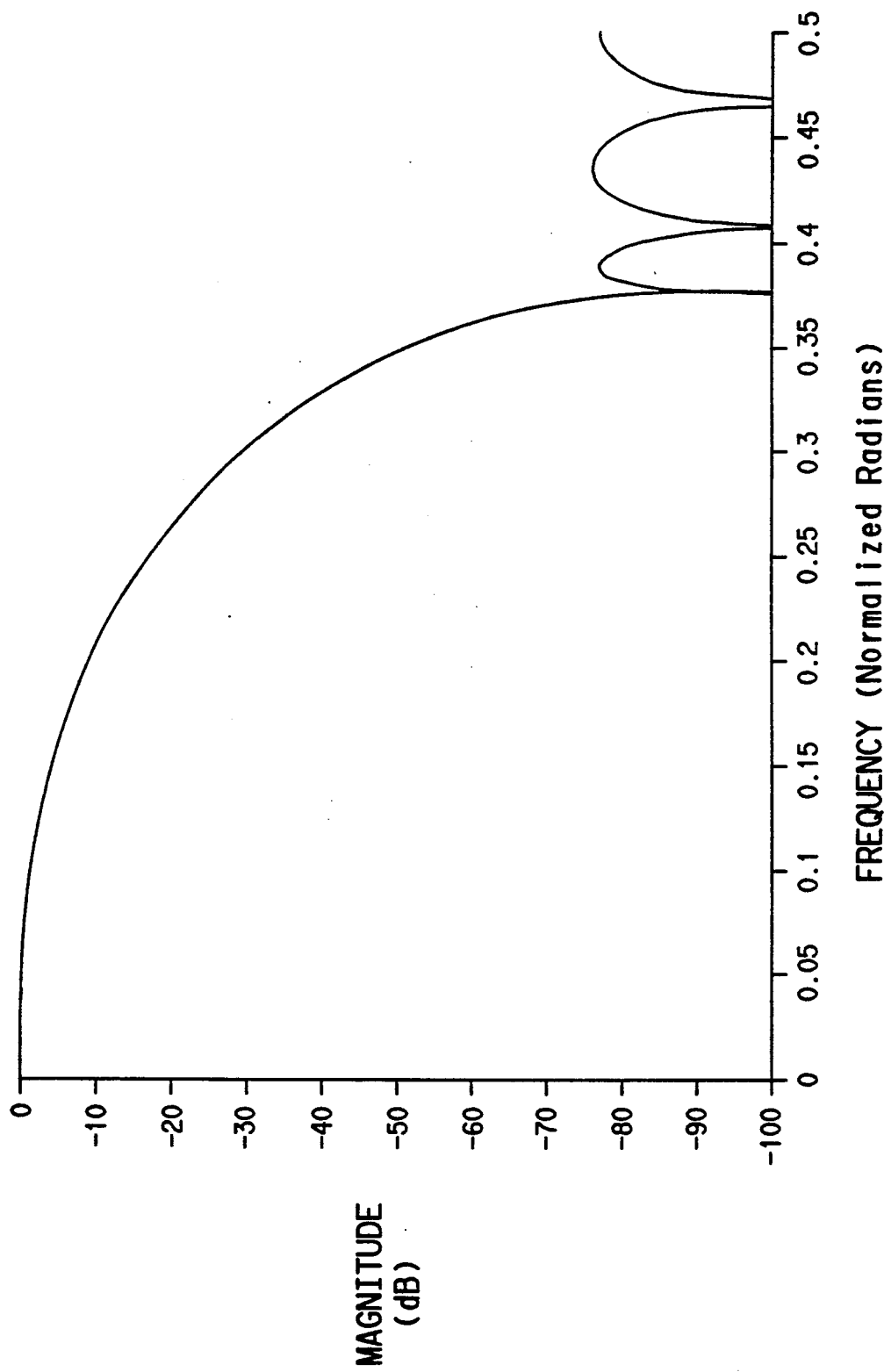
FIG. 16 is a graph showing the frequency response of the modified Kaiser window filter of the ideal version of the filter design method of the present invention as described in Example 3.
Figure 17:
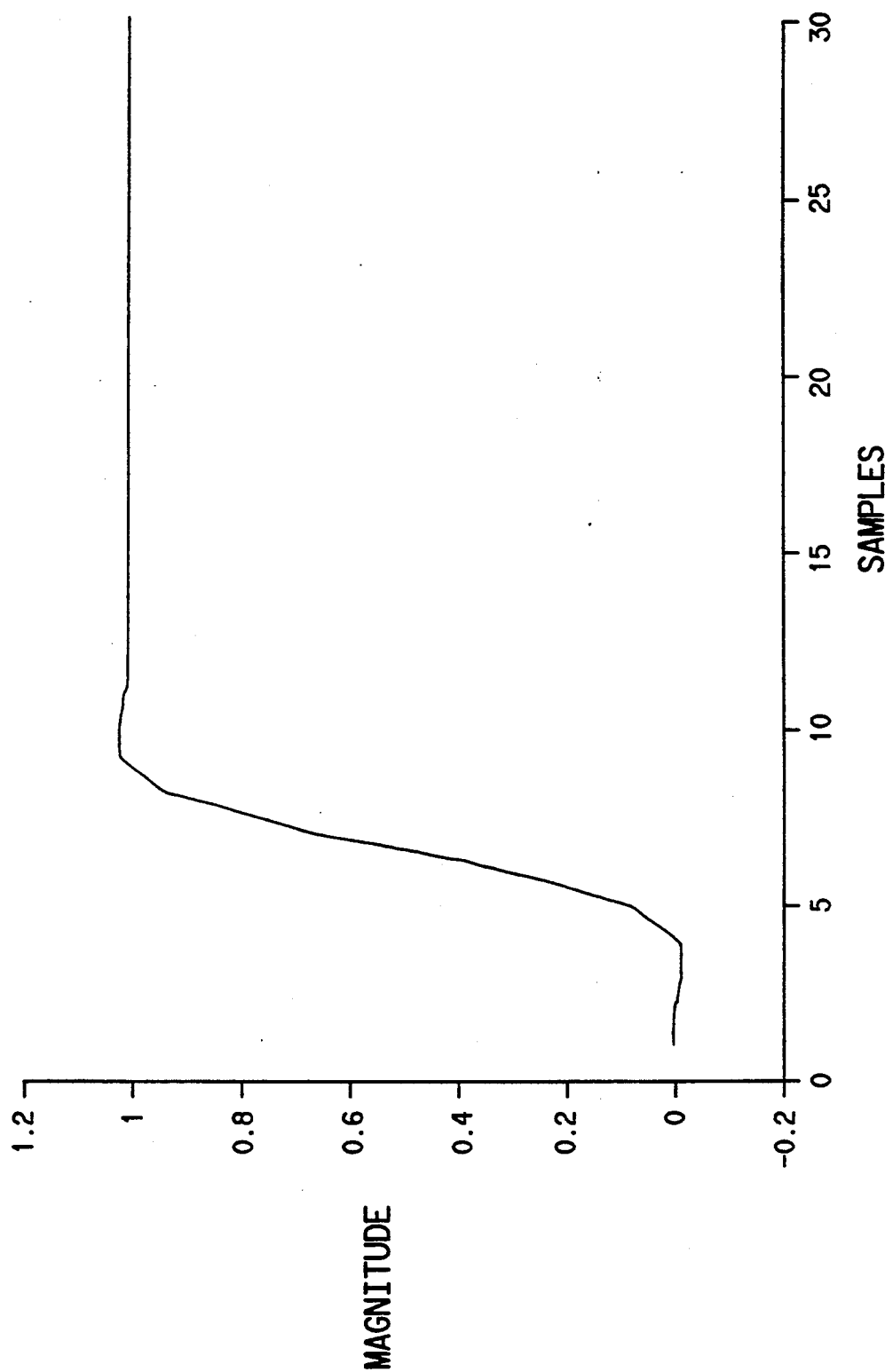
FIG. 17 is a graph showing the unit step response of the modified Kaiser window filter of the ideal version of the filter design method of the present invention as described in Example 3.

The frequency and step responses are plotted as shown in FIGS. 16 and 17, respectively.

The application of the filter to the input pixel data is a simple convolution sum. The input kernel location and movement is periodic in D.

EXAMPLE 4

Non-integer Reduction (R = I/D, D > I > b 1)

Figure 18:
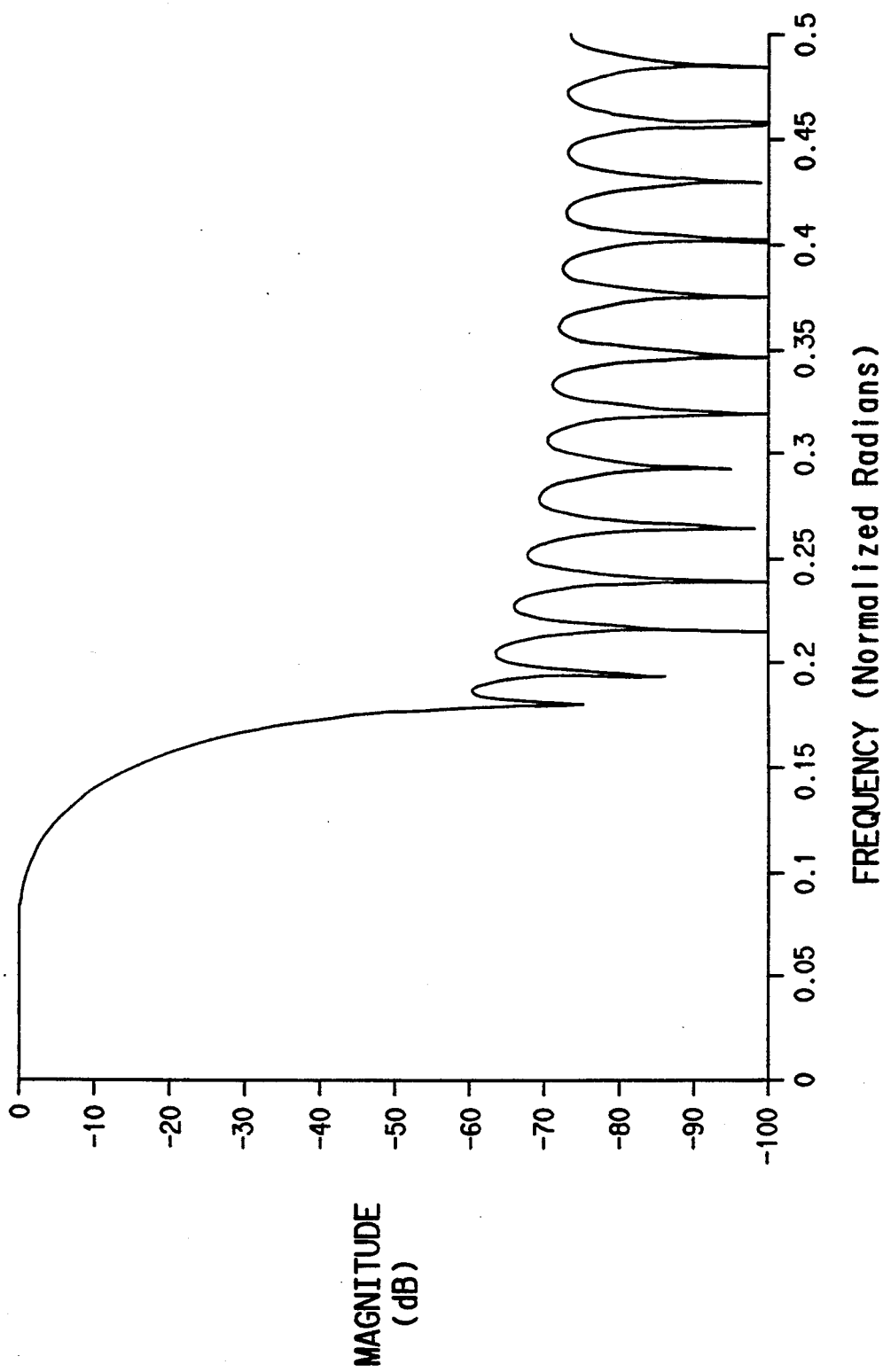
FIG. 18 is a graph showing the frequency response of a standard FIR1 Kaiser window low-pass filter of the prior art and as described in Example 3.

In this example, the resize ratio, R, was selected to be 0.75, the interpolation rate, I, to be 3 and the decimation rate, D, to be 4. Choosing the attenuation, $A_r = 60$ dB and a 50% alias-free bandwidth, the minimum input kernel was computed to be M = 12. The minimum filter length $N_{fmin}$ was 12. A kernel of 12 yielded a composite filter length of 37, exceeding the minimum criteria. The cutoff frequency was computed to be $f_c = 0.125$ normalized Hertz (a function of D), and the sharpness factor, $F_s$, was set to 1 to produce an ideal filter. A Kaiser window FIR low-pass filter of length 35 was designed using the Kaiser window sequence with $\beta = 5.653$. The Kaiser window filter frequency response is plotted as shown in FIG. 18.

The vector p(n) for a given sense was formed as:

$$p(n) = [1\ 1\ 1]$$

and was convolved with the window filter to produce the composite filter:

$h(a) = [0.0003\ 0.0003\ -0.0009\ -0.0038\ -0.0068$
$-0.0056\ 0.0032\ 0.0183\ 0.0299\ 0.0237\ -0.089$
$-0.0587\ -0.0946\ -0.0741\ 0.0333\ 0.2230\ 0.4462$
$0.6270\ 0.6966\ 0.6270\ 0.4462\ 0.2230\ 0.0333\ -0.0741$
$-0.0946\ -0.0587\ -0.0089\ 0.0237\ 0.0299\ 0.0183$
$0.0032\ -0.0056\ -0.0068\ -0.0038\ -0.0009\ 0.0003$
$0.0003]$

Figure 19:
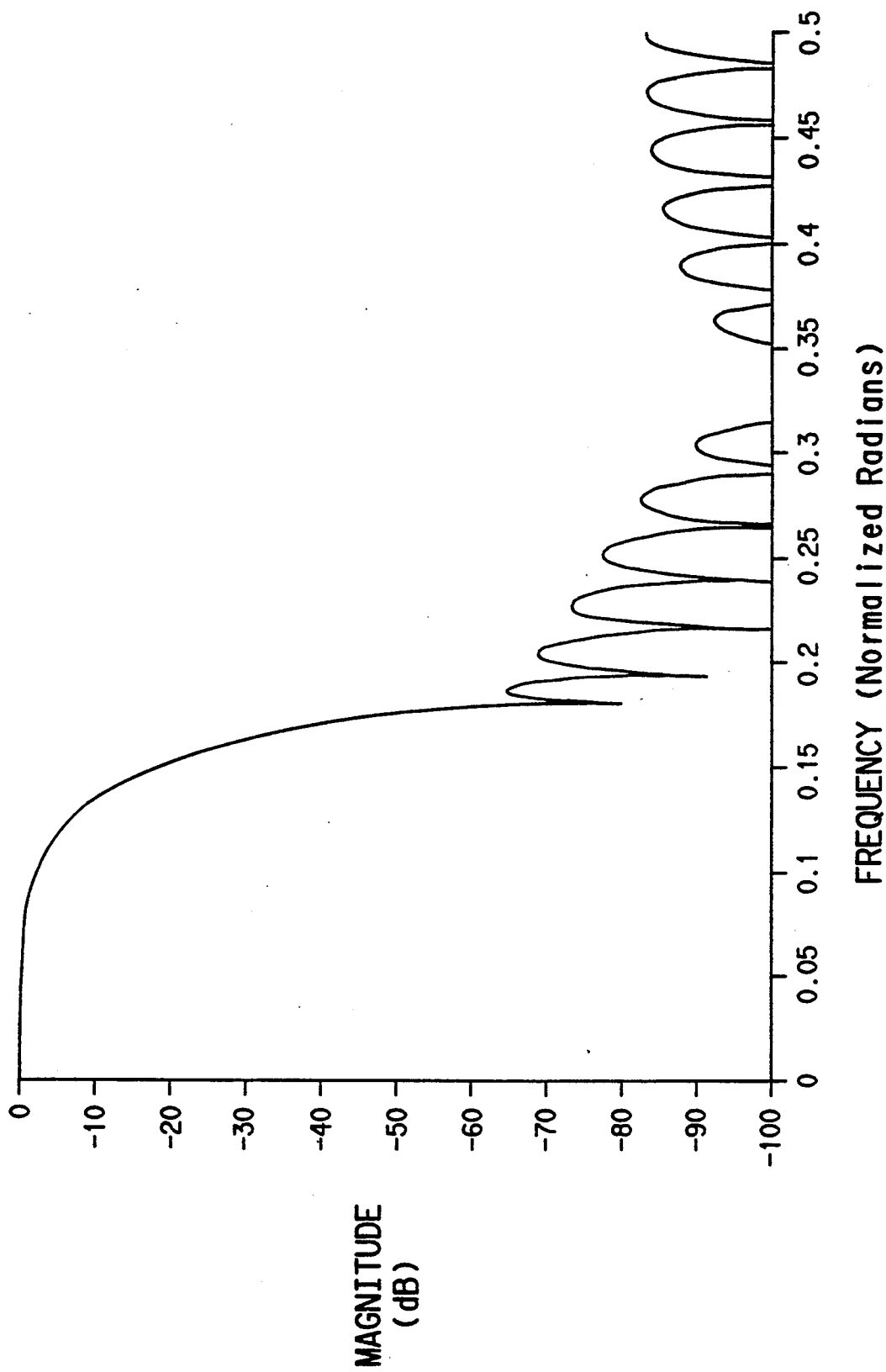
FIG. 19 is a graph showing the frequency response of the modified Kaiser window filter of the ideal version of the filter design method of the present invention as described in Example 4.
Figure 20:
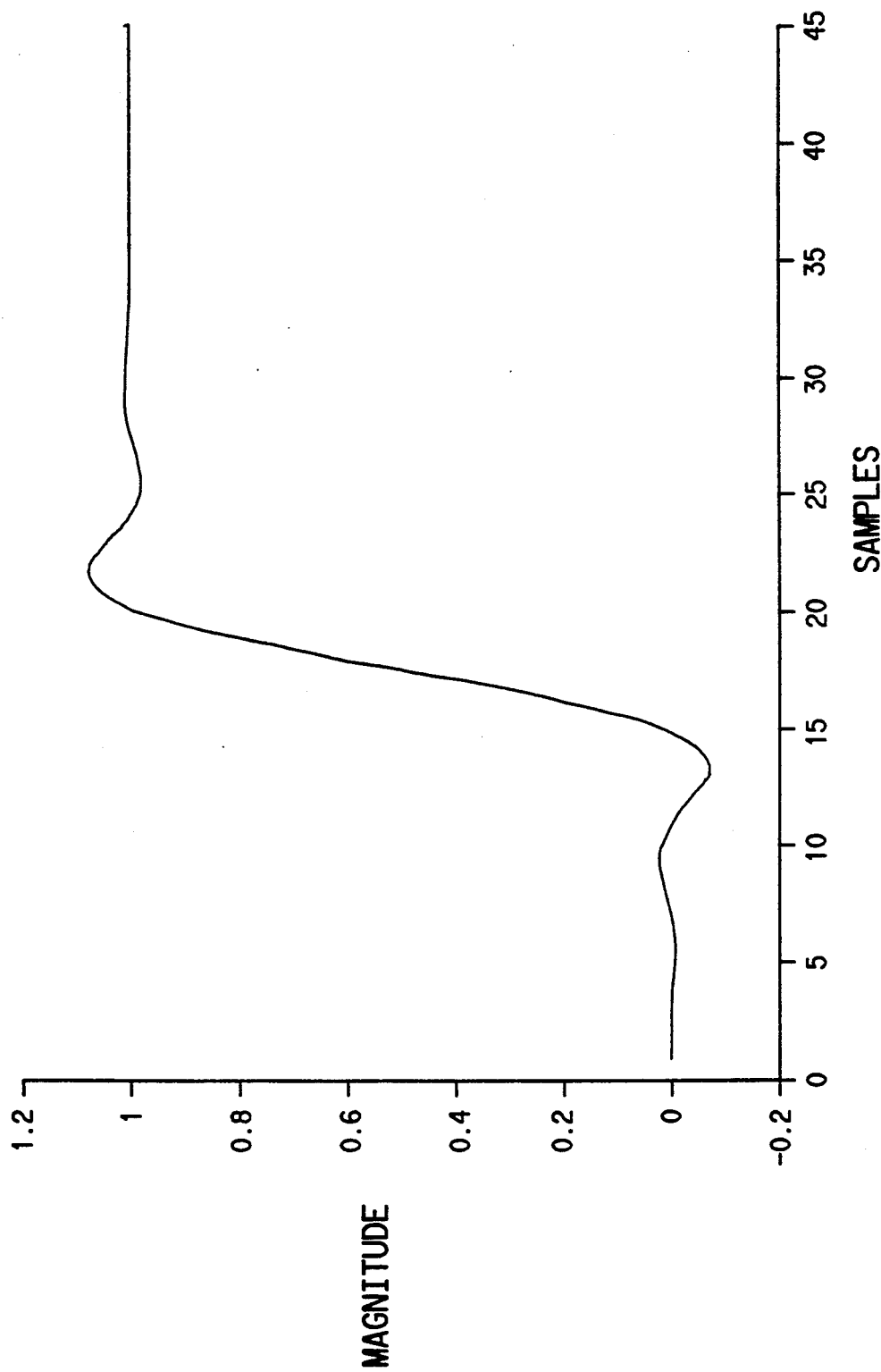
FIG. 20 is a graph showing the unit step response of the modified Kaiser window filter of the ideal version of the filter design method of the present invention as described in Example 4.

The frequency and step responses of the filter are plotted as shown in FIGS. 19 and 20, respectively.

In this case, the step response shows overshoot on the order of that of a cubic spline. The frequency response, however is much better than cubic spline filter. Aliasing effects are critical in this case. They must be minimized to preserve the image information content, even at the expense of step transition distortion.

The coefficient vectors was computed as above, resulting in the polyphase filter:

$$\bar{H}_c = \begin{bmatrix} \bar{h}_1 \\ \bar{h}_2 \\ \bar{h}_3 \end{bmatrix} = \begin{bmatrix} -0.0038 & 0.0032 & 0.0237 & -0.0946 & 0.2230 & 0.6966 & 0.2230 & -0.0946 & 0.0237 & 0.0032 & -0.0038 & 0.0003 \\ -0.0009 & -0.0056 & 0.0299 & -0.0587 & 0.0333 & 0.6270 & 0.4462 & -0.0741 & -0.0089 & 0.0183 & -0.0068 & 0.0003 \\ 0.0003 & -0.0068 & 0.0183 & -0.0089 & -0.0741 & 0.4462 & 0.6270 & 0.0333 & -0.0587 & 0.0299 & -0.0056 & -0.0009 \end{bmatrix}$$

Figure 21:
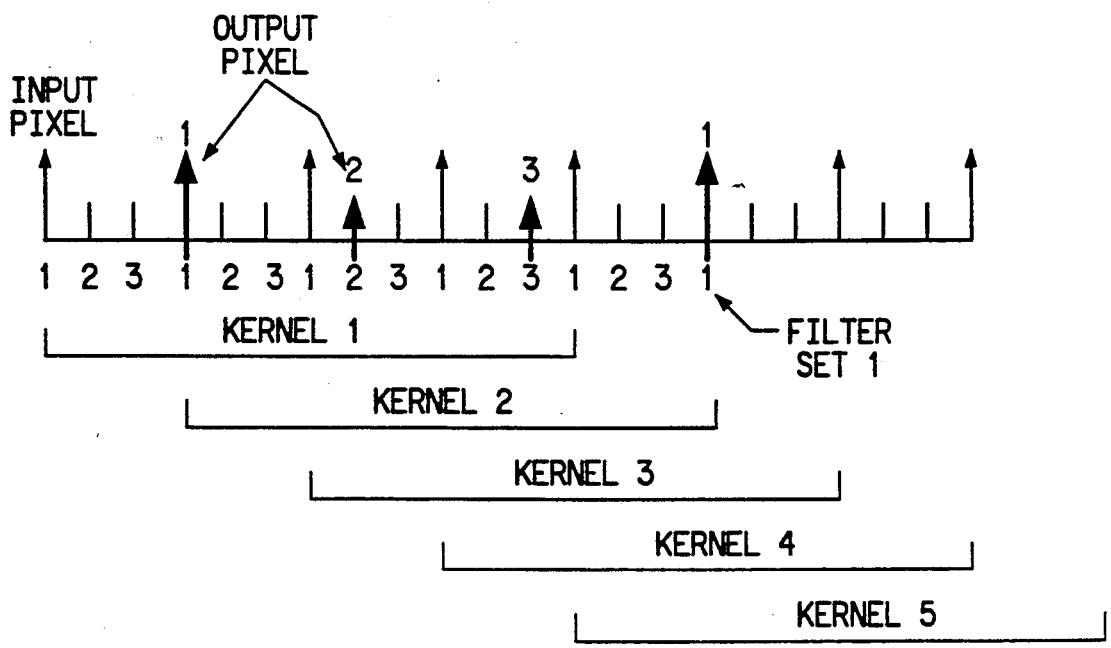
FIG. 21 is a graphic illustration showing how the method of designing a filter of the present invention applied in one sense selects a coefficient vector as a function of an output pixel mapped to an input space, and which input kernel is appropriate for the computation of the output pixels for Example 4.

The application of the filter in one dimension is shown in FIG. 2 where a kernel size of 4×4 was used for illustration. As seen in FIG. 21, output pixels were i5 located at interpolation fractional locations in the center of the input kernel. The filter selection order was governed by the decimation interval. The Dth input kernel had no output data points due to the left edge alignment of the input image space and the output image space. An extra kernel shift was required to begin the next period. The computational repeated after minimum of D+1 kernel shifts. Modulo-type calculations can also be done to determine if an output pixel lies within the input kernel space, and when to shift the input kernel. A symmetric pixel mapping would result in a slightly different filtering sequence.

Figure 22:
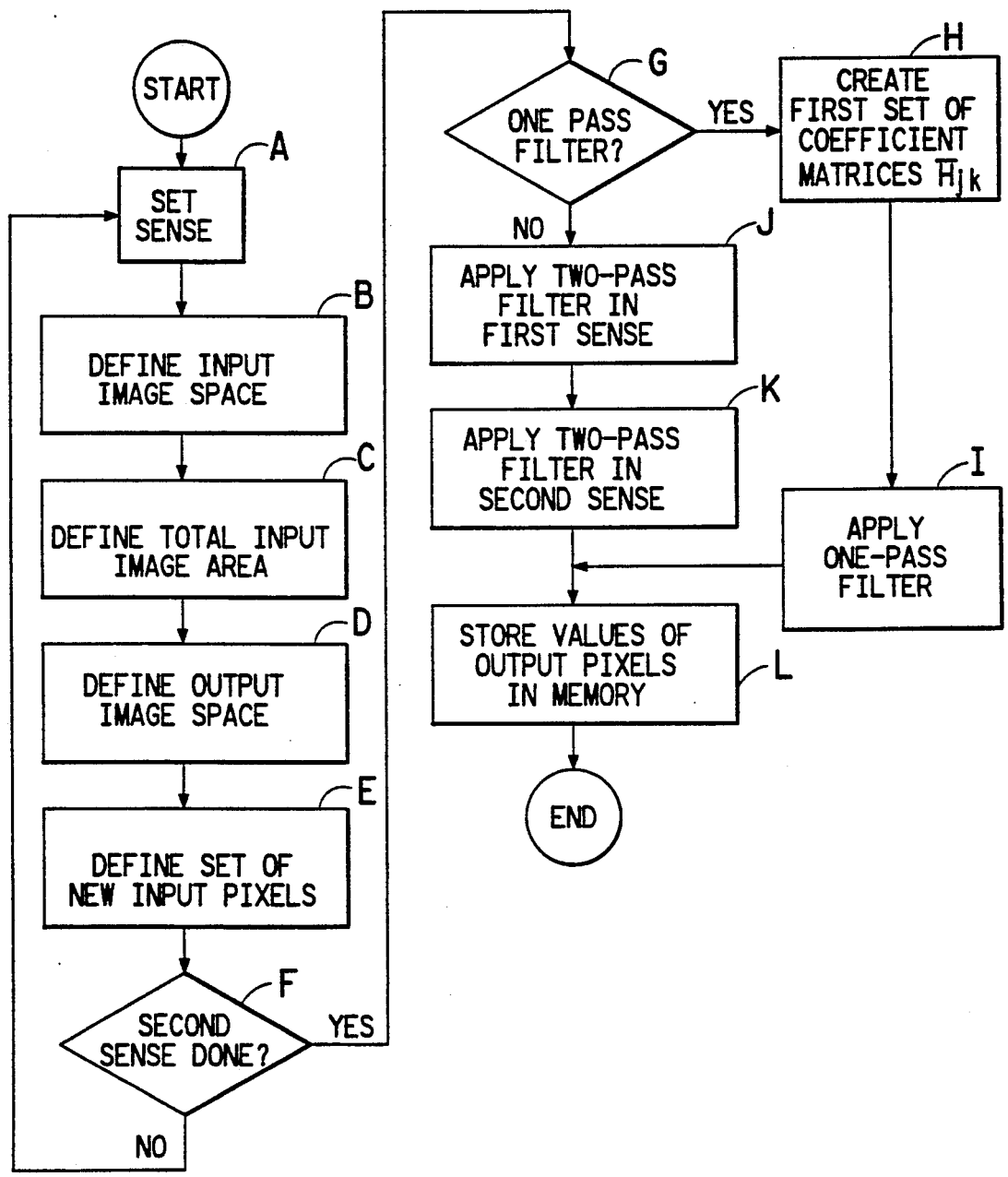
FIG. 22 is a flowchart illustrating the steps of the two-dimensional mapping method of the present invention.

According to a further aspect of the present invention there is provided a method of mapping the pixels of an output image space to an input image space when resizing the image. A flow chart showing the steps of the two-dimensional case of the method of the present invention is shown in FIG. 22. The first and second senses for the two-dimensional method are set as illustrated in block A of FIG. 22.

The mapping method comprises the step of defining the input image space as including a predetermined number of non-overlapping, original input pixels, where each original input pixel comprises a two-dimensional area represented by an original input pixel coordinate point and extends in a first input sense and a second input sense. The step of defining the input image space is designated by block B in FIG. 22. The values of the pixels of the input image space are then obtained from an input memory device. The memory device may be an input image scanner, such as input image scanner 12 as shown in FIG. 3.

The method of mapping of the present invention also includes the step of defining a total input image area. This step is designated by block C in FIG. 22. The total input image area is defined as the sum of the areas of each original input pixel, the total input image area having a first input extent in the first input sense and a second input extent in the second input sense.

The method of mapping also comprises the step of defining the output image space. This step is designated by block D in FIG. 22. The output image space is defined as including a predetermined number of output pixels, each output pixel comprising a two-dimensional area extending in a first output sense and a second output sense. The output image space has a first number of output pixels in the first output sense and a second number of output pixels in the second output sense.

A set of new input pixels is defined by dividing the first input extent by the first number of output pixels and the second input extent by the second number of output pixels. This step is illustrated by block E in FIG. 22. Each of the new input pixels is represented by a new input pixel coordinate point and corresponds to an output pixel. By defining the new set of input pixels, the boundaries of the original input pixels and the new input pixels are aligned and each of the output pixel coordinate points maps to a corresponding new input pixel coordinate point. With the mapping method of the present invention, the ratio of the spacing between the pixels in the output image space to the spacing between the pixels in the input image space (i.e., the pixel spacing ratio) is equal to the ratio of the number of pixels in the input image space to the number of pixels in the output image space (i.e., the pixel count ratio).

Decision diamond F in FIG. 22 asks whether the computations of the method of the present invention in the second sense have been completed. If they have, then either a one-pass filter or a two-pass filter may be applied as indicated by decision diamond G. A two-pass filter may be applied in the first sense as shown in block J and in the second sense as shown in block K of FIG. 22, or a one-pass filter may be applied as shown in block I of FIG. 22. If the one-pass filter is applied, then the first and second coefficient vector sets $\overline{H}_{c1}$ and $\overline{H}_{c2}$ are combined, and the first set of coefficient matrices $H_{jk}$ is created as designated in block H of FIG. 22 and as described in the method above. The filter is applied in the first and the second input senses to a neighborhood of the values of the original input pixels adjacent each new input pixel to compute the value of each of the new input pixels. The computed values are assigned to the corresponding output pixels, whereby the image is resized.

The values of the output pixels are then stored in an output memory device. In addition, the present invention includes the step of storing the values of the new input pixel coordinate points and the correspondence between the new input pixel coordinate points and the output pixel coordinate points in the output memory device. This step is designated by block L in FIG. 22. The output memory device may comprises RAM 36 as shown in FIG. 3, or disk 30 or archival storage 32 as shown in FIG. 3. Alternatively, the values of the output pixels may be stored on a piece of photographic of X-ray film.

In the method the present invention, the first and second input senses may align with the first and second output senses, respectively. In addition, the first and second input senses may be the same or different from the first and second output senses, respectively.

The flow chart of FIG. 22 represents the software implementation of the two-dimensional mapping method of the present invention. However, the mapping method is equally applicable to a hardware implementation. Also, it should be noted that the mapping method of the present invention may be extended to N senses other than two as described above, where N is a positive integer. In such circumstances, a pixel is defined as a picture element in N dimensions.

The mapping method of the present invention will be further clarified by the following examples, which are intended to be purely exemplary of the invention.

EXAMPLE 5

Figures 23B, 23C:
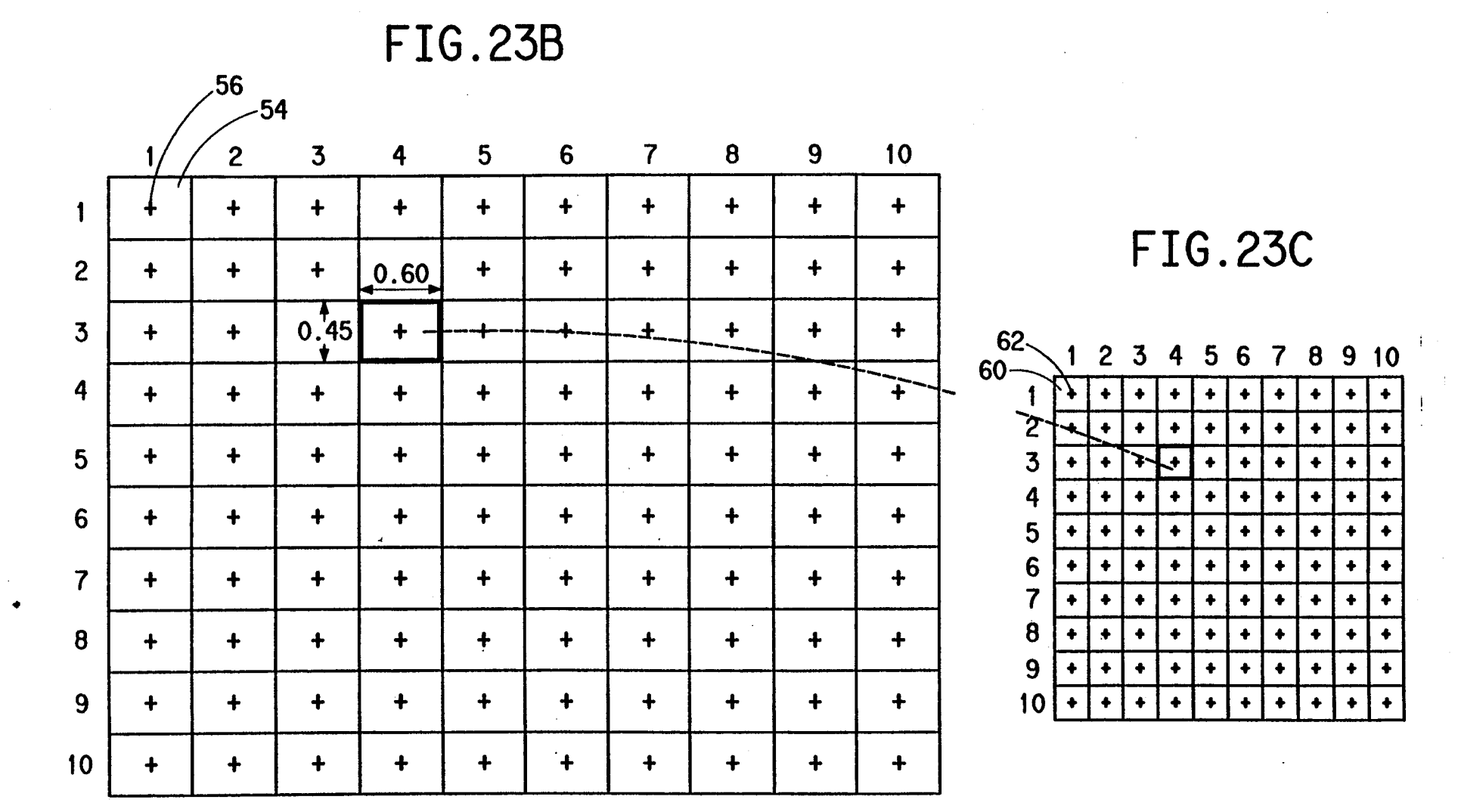

To illustrate the method of mapping of the present invention, reference is made to the example in FIGS. 23A-C, which illustrate mapping in two dimensions. In FIG. 23A, a plurality of original input pixels 50 are shown, each having an input pixel coordinate point 52. Each original input pixel is represented by a row and column designation, where the rows are designated by 1-6 and the columns are represented by 1-8. In FIG. 23A, the input image is 6×8 pixels in dimension, and each pixel is 0.75×0.75 units in dimension.

A predetermined number of output pixels 60 are shown in FIG. 23C. In this case, there are one hundred output pixels in an output image of dimension 10×10 pixels. Each output pixel 60 comprises a two-dimensional area extending in a first output sense and a second output sense and identified by an output pixel coordinate point 62.

The total input image area is defined as the sum of the areas of each original input pixel. The total input image area is divided by ten output pixels to define a set of new input pixels as shown at 54 in FIG. 23B. Each new input pixel 54 has a new input pixel coordinate point 56. Each of these new input pixels has a dimension of 0.60×0.45 units. Each coordinate point 62 of each output pixel 60 maps to a corresponding coordinate point 56 of each new input pixel 54, as shown by the dashed arrow from FIG. 23C to FIG. 23B.

EXAMPLE 6

As noted above, the method of the present invention may be extended to one dimension to map the pixels of an input data space to an output data space when resizing data. FIGS. 24A-C illustrate the method of mapping of the present invention applied in one dimension.

Eight non-overlapping, original input pixels 50' are shown in FIG. 24A. Each of the input pixels is 1.0 unit in length. Each of the input pixels is represented by an input pixel coordinate point 52'.

Ten output pixels 60' are shown in FIG. 24B, each of which are 0.8 units in length. Each output pixel 60' comprises a data segment represented by an output pixel coordinate point 62'.

A total input data segment is defined as the sum of the areas of each original input pixel. The total input data segment is divided by ten output pixels to define a new set of input pixels, 54' as shown in FIG. 24c. Each new input pixel 54' is represented by a new input pixel coordinate point 56'. Each coordinate point 56' of each new input pixel 54' maps to a corresponding coordinate point 62' of a corresponding output pixel 60'.

The mapping method of the present invention may be used with the filter as described above to resize an input image according to the method described above. When this is done, and when the ratio of the decimation rate to the interpolation rate reduced to its lowest common denominator has one even and one odd number, only every other coefficient vector in the first and second sets $\overline{H}_{c1}$ and $\overline{H}_{c2}$, respectively, of coefficient vectors is used.

Figure 25A:
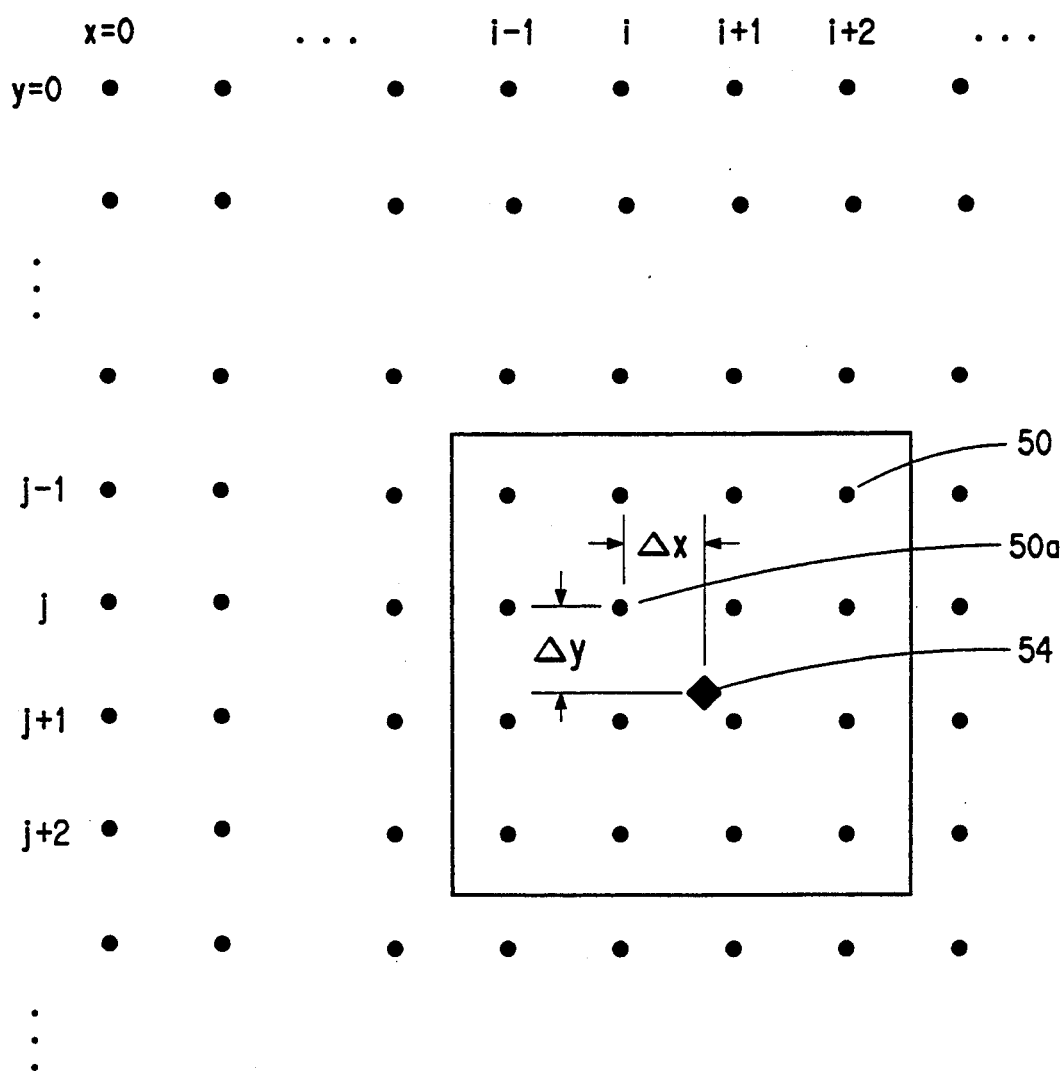
FIG. 25A is a plan view illustrating a plurality of original input pixels to which a set of $4 \times 4$ coefficient matrices is applied when resizing an image in accordance with the image resizing method of the present invention.
Figure 25B:
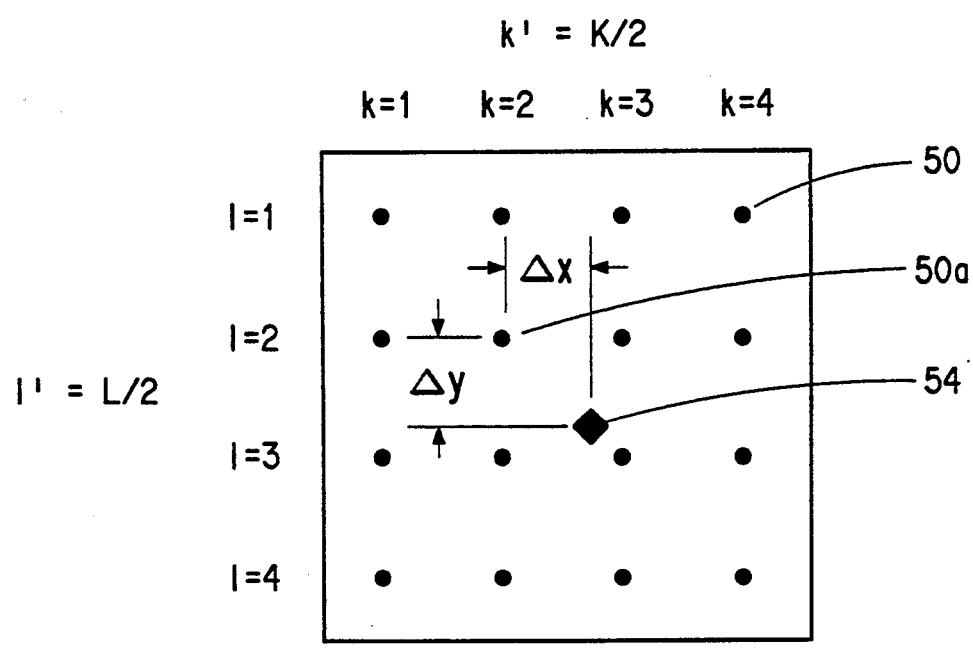
FIG. 25B is a plan view illustrating only the $4 \times 4$ coefficient matrix of FIG. 25A and the original input pixels to which this matrix is applied.

FIGS. 25A and B illustrate an application of the two-dimensional mapping method of the present invention to the method of applying a filter to resize an image of the present invention. FIG. 25A is a plan view of a plurality of the original input pixels and a 4×4 coefficient matrix applied thereto when the image is resized in accordance with the image resizing method of the present invention, and FIG. 25B is a plan view of the coefficient matrix of FIG. 25A and the original input pixels to which the matrix is applied. In FIGS. 25A and B, a plurality of original input pixels 50 is shown, and input pixel 50a, which is surrounded by the circle, is the alignment of the designated coefficient in the matrix with an original input pixel. New input pixel 54 is shown by the black diamond. In FIG. 25A, i and j represent the integer parts of the coordinate point of new input pixel 54, and $\Delta x$ and $\Delta y$ represent the fractional parts.

First and second sets of coefficient vectors $\overline{H}_{c1}$ and $\overline{H}_{c2}$, respectively, are created according to the method described above, and are combined into a first set of matrices according to the method as described above. In this application a 4×4 set of coefficient matrices is used. The first set of coefficient matrices defines K, L, k' and l' as shown in FIG. 25B, where k'=K/2 and l'=L/2, and K=L=4. The first set of coefficient matrices is aligned with original input pixels, specifically is k'aligned with i, and l' is aligned with j. The first set of coefficient matrices is applied to each original input pixel 50 to obtain a set of new input pixels, only one of which is shown at 54.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

We claim:

1. A method of designing a filter for resizing an input image comprising a plurality of input pixels to generate a resized image comprising a plurality of corresponding output pixels while preserving the information content of the image, comprising the steps of:
   (a) selecting a first interpolation rate and a first decimation rate for a first sense;
   (b) selecting a second interpolation rate and a second decimation rate for a second sense;
   (c) selecting a first stopband attenuation and a a first sharpness factor for the first sense and a second stopband attenuation and a second sharpness factor for the second sense;
   (d) computing a first cutoff frequency for the first sense and a second cutoff frequency for the second sense;
   (e) establishing an input kernel having a first number of elements in the first sense and a second number of elements in the second sense;
   (f) generating a first low-pass filter for the first sense, the first low-pass filter comprising a first filter vector including a plurality of first coefficients;
   (g) modifying the first low-pass filter, comprising the steps of:
      (1) creating a first vector comprising a plurality of elements each having a value equal to unity, the first vector having a dimensionality equal to the first interpolation rate, and
      (2) convolving the first filter vector with the first vector to create a modified first filter vector comprising a plurality of the first coefficients;
   (h) generating a second low-pass filter for the second sense, the second low-pass filter comprising a second filter vector including a plurality of second coefficients;
   (i) modifying the second low-pass filter, comprising the steps of:
      (1) creating a second vector comprising a plurality of elements each having a value equal to unity and the second vector having a dimensionality equal to the second interpolation rate, and
      (2) convolving the second filter vector with the second vector to create a modified second filter vector comprising a plurality of the second coefficients;
   (j) creating a first set of coefficient vectors by selecting a plurality of the coefficients of the modified first filter vector as a function of the first interpolation rate, the first decimation rate and the first number of elements;
   (k) creating a second set of coefficient vectors by selecting a plurality of the coefficients of the modified second filter vector as a function of the second interpolation rate, the second decimation rate and the second number of elements;
   (l) applying the first and second sets of coefficient vectors to a neighborhood of the values of input pixels adjacent each output pixel to compute the value of each output pixel and assigning the computed values to the corresponding output pixels, thereby producing the resized image; and
   (m) storing the resized image in an output memory device.

2. The method of claim 1, further including the step of obtaining the input image from an input memory device.

3. The method of claim 1, further including the step of storing the first and second sets of coefficient vectors in the output memory device.

4. The method of claim 1, wherein the step of applying the first and second sets of coefficient vectors comprises the steps of applying the first set of coefficient vectors to the neighborhood of the values of the input pixels in the first sense to obtain a resultant set of pixels and applying the second set of coefficient vectors in the second sense to the resultant set of pixels.

5. The method of claim 1, wherein the step of applying the first and second sets of coefficient vectors comprises the steps of combining the first and second sets of coefficient vectors into a first set of matrices and applying the first set of matrices to the neighborhood of the values of the input pixels simultaneously in the first and second senses.

6. The method of claim 1, wherein the first interpolation rate and the first decimation rate are integers.

7. The method of claim 1, wherein the second interpolation rate and the second decimation rate are integers.

8. The method of claim 1, wherein the first and second numbers of elements are rounded to the next higher even integer.

9. The method of claim 1, wherein the step of generating a first low-pass filter includes the step of establishing a first window-based filter having a first predetermined odd filter length, the first predetermined filter length being a function of the first number of elements and the first interpolation rate.

10. The method of claim 1, wherein the step of generating a first low-pass filter further includes the step of establishing a first predetermined window length, the first predetermined window length being a function of the first number of elements and the first interpolation rate.

11. The method of claim 10, wherein the step of generating a first low-pass filter further includes the step of generating a first Kaiser window sequence, the first Kaiser window sequence being a function of the first predetermined window length and the first stopband attenuation.

12. The method of claim 11, wherein the step of generating a first low-pass filter further includes the step of generating a first Kaiser window filter, the first Kaiser window filter being a function of the first cutoff frequency, the first sharpness factor and the first Kaiser window sequence.

13. The method of claim 1, wherein the step of generating a second low-pass filter includes the step of establishing a second window filter having a second predetermined odd filter length, the second predetermined filter length being a function of the second number of elements and the second interpolation rate.

14. The method of claim 1, wherein the step of generating a second low-pass filter further includes the step of establishing a second predetermined window length, the second predetermined window length being a function of the second number of elements and the second interpolation rate.

15. The method of claim 14, wherein the step of generating a second low-pass filter further includes the step of generating a second Kaiser window sequence, the second Kaiser window sequence being a function of the second predetermined window length and the second stopband attenuation.

16. The method of claim 15, wherein the step of generating a second low-pass filter further includes the step of generating a second Kaiser window filter, the second Kaiser window filter being a function of the second cutoff frequency, the second sharpness factor and the second Kaiser window sequence.

17. The method of claim 1, wherein the first decimation rate is less than the first interpolation rate and the second decimation rate is less than the second interpolation rate.

18. The method of claim 17, wherein the step of establishing an input kernel includes the step of selecting the first and second number of elements as a function of the first and second interpolation rate, respectively, the first and second decimation rate, respectively, the first and second cutoff frequency, respectively, the first and second sharpness factor, respectively and the first and second stopband attenuation, respectively.

19. The method of claim 1, wherein the first decimation rate is less than the first interpolation rate and the second decimation rate is greater than the second interpolation rate.

20. The method of claim 19, wherein the step of establishing an input kernel includes the step of selecting the first number of elements as a function of the first interpolation rate, the first cutoff frequency, the first sharpness factor and the first stopband attenuation and computing the second number of elements as a function of the second decimation rate, the second cutoff frequency, the second sharpness factor and the second stopband attenuation.

21. The method of claim 1, wherein the first decimation rate is greater than the first interpolation rate and the second decimation rate is less than the second interpolation rate.

22. The method of claim 21, wherein the step of establishing an input kernel includes the step of computing the first number of elements as a function of the first decimation rate, the first cutoff frequency, the first sharpness factor and the first stopband attenuation and selecting the second number of elements as a function of the second interpolation rate, the second cutoff frequency, the second sharpness factor and the second stopband attenuation.

23. The method of claim 1, wherein the first decimation rate is greater than the first interpolation rate and the second decimation rate is greater than the second interpolation rate.

24. The method of claim 23, wherein the step of establishing an input kernel includes the step of computing the first number of elements as a function of the first interpolation rate, the first cutoff frequency, the first sharpness factor and the first stopband attenuation, and computing the second number of elements as a function of the second decimation rate, the second cutoff frequency, the second sharpness factor and the second stopband attenuation.

25. The method of claim 1, further including the step of modifying the first set of coefficient vectors in the first sense by identifying the output pixels aligning exactly with the input pixels.

26. The method of claim 25, further including the step of identifying the values of the first set of coefficient vectors corresponding to the output pixels aligning exactly with the input pixels.

27. The method of claim 26, further including the step of modifying the values of the first set of coefficient vectors so that the aligned output pixels each has a value equal to the value of the corresponding input pixel.

28. The method of claim 27, further including the step of identifying the values of the second set of coefficient vectors corresponding to the output pixels aligning exactly with the input pixels.

29. The method of claim 28, further including the step of modifying the values of the second set of coefficient vectors so that the aligned output pixels each has a value equal to the value of the corresponding input pixel.

30. The method of claim 29, wherein the step of applying the first and second sets of coefficient vectors further includes the steps of applying the first set of coefficient vectors to the neighborhood of the values of the input pixels in the first sense to obtain a resultant set of pixels and applying the second set of coefficient vectors in the second sense to the neighborhood of the values of the resultant set of pixels.

31. The method of claim 29, wherein the step of applying the first and second sets of coefficient vectors further includes the steps of combining the first and second sets of coefficient vectors into a first set of coefficient matrices and applying the first set of coefficient matrices to the input pixels simultaneously in the first and second senses.

32. A method of resizing an input image comprising a plurality of input pixels to generate a resized image comprising a plurality of corresponding output pixels while preserving the information content of the image, comprising the steps of:
  (a) sampling the input image at a predetermined first interval in a first sense and at a predetermined second interval in a second sense for producing input data values for the location of each input pixel;
  (b) establishing a third interval in the first sense and a predetermined fourth interval in the second sense for producing output data values for the location of each output pixel;
  (c) designing a filter for resizing the image, comprising the steps of:
    (1) selecting a first interpolation rate and a first decimation rate in a first sense,
    (2) selecting a second interpolation rate and a second decimation rate in a second sense,
    (3) establishing an input kernel having a first number of elements in the first sense and a second number of elements in the second sense,
    (4) generating a first low-pass filter for the first sense, the first low-pass filter comprising a first filter vector including a plurality of first coefficients,
    (5) modifying the first low-pass filter, comprising the steps of:
      (A) creating a first vector comprising a plurality of elements each having a value equal to unity, the first vector having a dimensionality equal to the first interpolation rate, and
      (B) convolving the first filter vector with the first vector to create a modified first filter vector comprising a plurality of the first coefficients,
    (6) generating a second low-pass filter for the second sense, the second low-pass filter comprising a second filter vector including a plurality of second coefficients,
    (7) modifying the second low-pass filter, comprising the steps of:
      (A) creating a second vector comprising a plurality of elements each having a value equal to unity, the second vector having a dimensionality equal to the second interpolation rate, and
      (B) convolving the second filter vector with the second vector to create a modified second filter vector comprising a plurality of the second coefficients,
    (8) creating a first set of coefficient vectors by selecting a plurality of the coefficients of the modified first filter vector as a function of the first interpolation rate, the first decimation rate and the first number of elements,
    (9) creating a second set of coefficient vectors by selecting a plurality of the coefficients of the modified second filter vector as a function of the second interpolation rate, the second decimation rate and the second number of elements;
  (d) applying the first and second sets of coefficient vectors to a neighborhood of the values of the input pixels adjacent each output pixel to compute the value of each output pixel and assigning the computed values to the corresponding output pixel, thereby producing a resized image; and
  (e) storing the resized image in an output memory device.

33. The method of claim 32, further including the step of storing the data values of each of the input pixels in an input memory device.

34. The method of claim 32, further including the step of storing the output data values of each of the output pixels in the output memory device.

35. The method of claim 32, further including the step of storing the first and second sets of coefficient vectors in the output memory device.

36. The method of claim 32, wherein the step of applying the first and second sets of coefficient vectors includes the step of applying the first set of coefficient vectors to the neighborhood of the values of the input pixels in the first sense to obtain a resultant set of input pixels and applying the second set of coefficient vectors in the second sense to the neighborhood of the values of the resultant set of pixels.

37. The method of claim 32, wherein the step of applying the first and second sets of coefficient vectors further includes the steps of combining the first and second sets of coefficient vectors into a first set of matrices and applying the first set of matrices to the neighborhood of the values of the input pixels simultaneously in the first and second senses.

38. A method of mapping the pixels of an output image space to an input image space when resizing an image, comprising the steps of:
  (a) defining the input image space as including a predetermined number of non-overlapping, original input pixels, each original input pixel comprising a two-dimensional area represented by an original input pixel coordinate point and extending in a first input sense and a second input sense;
  (b) defining a total input image area as the sum of the areas of each original input pixel, the total input image area having a first input extent in the first input sense and a second input extent in the second input sense;
  (c) defining the output image space as including a predetermined number of output pixels, each output pixel comprising a two-dimensional area extending in a first output sense and a second output sense, the output image space having a first number of output pixels in the first output sense and a second number of output pixels in the second output sense;
  (d) defining a set of new input pixels image by dividing the first input extent by the first number of output pixels and dividing the second input extent by the second number of output pixels, each of the new input pixels being represented by a new input pixel coordinate point and corresponding to an output pixel, whereby the boundaries of the original input pixels and the new input pixels are aligned and each of the output pixel coordinate points maps to a corresponding new input pixel coordinate point;
  (e) applying a filter for resizing the input image in the first and second input senses to a neighborhood of the values of the original input pixels adjacent each new input pixel to compute the value of each of the new input pixels and assigning the computed values to the corresponding output pixels, whereby the image is resized; and (f) storing the values of the output pixels in an output memory device.

39. The method of claim 38, further including the step of obtaining the values of the pixels of the input image space from an input memory.

40. The method of claim 38, further including the step of storing the values of the new input pixel coordinate points and the correspondence between the values of the new input pixel coordinate points and the values of the output pixel coordinate points in the output memory device.

41. The method of claim 38, wherein each of the first and second input senses aligns with each of the first and second output senses, respectively.

42. The method of claim 38, wherein each of the first and second input senses is different from each of the first and second output senses, respectively.

43. The method of claim 38, wherein each of the first and second input senses is the same as each of the first and second output senses, respectively.

* * * * *